US007533034B2

(12) United States Patent  (10) Patent No.: US 7,533,034 B2
Laurin et al.  (45) Date of Patent: May 12, 2009

(54) IDEA MANAGEMENT

(75) Inventors: André Paul Cyrille Laurin, Pointe-Claire (CA); Karell Serge Jean Ste-Marie, La Salle (CA)

(73) Assignee: BrainBank, Inc., Dorvel, Quebec (CA)

( * ) Notice: Subject to any disclaimer, the term of this patent is extended or adjusted under 35 U.S.C. 154(b) by 1410 days.

(21) Appl. No.: 10/044,779

(22) Filed: Jan. 10, 2002

(65) Prior Publication Data

US 2002/0107722 A1   Aug. 8, 2002

Related U.S. Application Data

(63) Continuation-in-part of application No. 09/375,401, filed on Aug. 17, 1999, now abandoned.

(60) Provisional application No. 60/144,877, filed on Jul. 20, 1999.

(51) Int. Cl.
*G06F 17/60* (2006.01)
(52) U.S. Cl. .......................................................... 705/7
(58) Field of Classification Search ...................... 705/1, 705/7, 10
See application file for complete search history.

(56) References Cited

U.S. PATENT DOCUMENTS

| | | | |
|---|---|---|---|
| 5,191,522 A | 3/1993 | Bosco et al. | 364/401 |
| 5,377,355 A | 12/1994 | Hager et al. | 395/650 |
| 5,537,314 A | 7/1996 | Kanter | 364/406 |
| 5,537,618 A | 7/1996 | Boulton et al. | 395/161 |
| 5,566,291 A | 10/1996 | Boulton et al. | 395/161 |
| 5,604,803 A | 2/1997 | Aziz | 380/25 |
| 5,625,776 A | 4/1997 | Johnson | 395/227 |
| 5,765,138 A | 6/1998 | Aycock et al. | 705/7 |
| 5,765,140 A | 6/1998 | Knudson et al. | 705/9 |
| 5,790,847 A | 8/1998 | Fisk et al. | 395/604 |

(Continued)

FOREIGN PATENT DOCUMENTS

CA  2280372  8/1999

(Continued)

OTHER PUBLICATIONS

"ISO 9000 Users Will 'Test Drive' Revised Quality Standards," *ISO*, Ref.: 751, Jul. 20, 1998, Retrieved From Internet: http://www.iso.org/iso/pressrelease.htm?refid=Ref751 pp. 1 and 2.

*Primary Examiner*—Romain Jeanty
(74) *Attorney, Agent, or Firm*—Bromberg & Sunstein LLP

(57) ABSTRACT

A system, method and computer program product for idea management and development of a structured idea. The methodology includes obtaining a structured response over a computer network from an employee of a business. In certain embodiments of the invention the system and method may be employed without the use of a computer network. The structured response is developed through a series of templates in which the employee enters information into a template. From the responses in the first template a second template is selected. The second template may request information regarding the financial consequences of implementing the idea. Once the structured idea is developed through the series of templates a routing decision is made by the server. The server determines one or more members of the business management to whom the idea is routed based in part on information entered by the employee in the templates.

79 Claims, 23 Drawing Sheets

U.S. PATENT DOCUMENTS

| | | | |
|---|---|---|---|
| 5,878,233 A | 3/1999 | Schloss | 395/200.55 |
| 5,911,043 A | 6/1999 | Duffy et al. | 395/200.33 |
| 5,991,414 A | 11/1999 | Garay et al. | 380/25 |
| 6,026,387 A | 2/2000 | Kesel | 706/52 |
| 6,029,192 A | 2/2000 | Hill et al. | 709/206 |
| 6,085,201 A * | 7/2000 | Tso | 715/205 |
| 6,115,691 A | 9/2000 | Ulwick | 705/7 |
| 6,195,652 B1 | 2/2001 | Fish | 707/2 |
| 6,275,811 B1 | 8/2001 | Ginn | 705/10 |
| 6,347,332 B1 | 2/2002 | Malet et al. | 709/205 |
| 6,452,613 B1 | 9/2002 | Lefebvre et al. | 345/733 |
| 6,556,974 B1 * | 4/2003 | D'Alessandro | 705/10 |
| 6,557,013 B1 | 4/2003 | Ziff et al. | 707/205 |
| 6,631,184 B1 | 10/2003 | Weiner | 379/92.01 |
| 6,961,756 B1 | 11/2005 | Dilsaver et al. | 709/205 |
| 7,043,454 B2 | 5/2006 | Powell | 705/59 |
| 7,043,565 B1 | 5/2006 | Madden et al. | 709/250 |
| 7,069,592 B2 | 6/2006 | Porcari | 726/26 |
| 7,082,412 B1 | 7/2006 | Treider et al. | 705/38 |
| 2001/0032189 A1 | 10/2001 | Powell | 705/59 |
| 2001/0037460 A1 | 11/2001 | Porcari | 713/201 |
| 2001/0039505 A1 | 11/2001 | Cronin | 705/7 |
| 2001/0044834 A1 | 11/2001 | Bradshaw et al. | 709/217 |
| 2002/0044634 A1 | 4/2002 | Rooke et al. | 379/93.01 |
| 2002/0065709 A1 | 5/2002 | MacKenzie | 705/10 |
| 2002/0065802 A1 | 5/2002 | Uchiyama | 707/1 |
| 2002/0082875 A1 | 6/2002 | Best-Devereux | 705/4 |
| 2002/0091543 A1 | 7/2002 | Thakur | 705/1 |
| 2002/0095305 A1 | 7/2002 | Gakidis et al. | 705/1 |
| 2002/0107697 A1 | 8/2002 | Jensen | 705/1 |
| 2002/0107722 A1 | 8/2002 | Laurin et al. | 705/10 |
| 2002/0107823 A1 | 8/2002 | Lefebvre et al. | 706/46 |
| 2002/0111824 A1 | 8/2002 | Grainger | 705/1 |
| 2002/0161733 A1 | 10/2002 | Grainger | 706/45 |
| 2002/0188498 A1 | 12/2002 | Stoloff et al. | 705/10 |
| 2003/0004766 A1 | 1/2003 | Sandoval et al. | 705/5 |
| 2003/0036947 A1 | 2/2003 | Smith, III et al. | 705/10 |
| 2003/0061111 A1 | 3/2003 | Dutta et al. | 705/26 |
| 2003/0074287 A1 | 4/2003 | Shuder et al. | 705/32 |
| 2003/0084051 A1 | 5/2003 | Depura et al. | 707/10 |
| 2003/0149588 A1 | 8/2003 | Joao | 705/1 |
| 2003/0172020 A1 | 9/2003 | Davies et al. | 705/36 |
| 2003/0187706 A1 | 10/2003 | Buchmiller et al. | 705/7 |
| 2003/0189585 A1 | 10/2003 | Forkner et al. | 345/700 |
| 2003/0195764 A1 | 10/2003 | Baker et al. | 705/1 |
| 2004/0073443 A1 | 4/2004 | Gabrick et al. | 705/1 |
| 2004/0153503 A1 | 8/2004 | Furuta | 709/204 |
| 2004/0181417 A1 | 9/2004 | Piller et al. | 705/1 |
| 2004/0186738 A1 | 9/2004 | Reisman | 705/1 |
| 2004/0220881 A1 | 11/2004 | Powell | 705/59 |
| 2004/0230550 A1 | 11/2004 | Simpson et al. | 707/1 |
| 2005/0033807 A1 | 2/2005 | Lowrance et al. | 709/24 |
| 2005/0044135 A1 | 2/2005 | Klausnitzer | 709/201 |
| 2005/0114760 A1 | 5/2005 | Arregui et al. | 715/513 |
| 2005/0228684 A1 | 10/2005 | Pogodin et al. | 705/1 |
| 2005/0240428 A1 | 10/2005 | Gabrick et al. | 705/1 |
| 2005/0267777 A1 | 12/2005 | Bentley, III | 705/1 |
| 2005/0267807 A1 | 12/2005 | Bentley, III | 705/14 |
| 2005/0267875 A1 | 12/2005 | Bentley, III | 707/3 |
| 2006/0031092 A1 | 2/2006 | Cronin | 705/1 |
| 2006/0031221 A1 | 2/2006 | Malman | 707/1 |
| 2006/0059151 A1 | 3/2006 | Martinez et al. | 707/7 |
| 2006/0106627 A1 | 5/2006 | Al-Nujaidi | 705/1 |
| 2006/0136364 A1 | 6/2006 | Hagedorn et al. | 707/1 |
| 2006/0168101 A1 | 7/2006 | Mikhailov et al. | 709/217 |
| 2006/0178928 A1 | 8/2006 | Carney et al. | 705/10 |
| 2006/0200422 A1 | 9/2006 | Powell | 705/59 |
| 2006/0200423 A1 | 9/2006 | Powell | 705/59 |
| 2006/0212406 A1 | 9/2006 | Powell | 705/59 |
| 2006/0218173 A1 | 9/2006 | Hicks et al. | 707/102 |

FOREIGN PATENT DOCUMENTS

| | | |
|---|---|---|
| EP | 0 426 184 | 6/1997 |
| EP | 1 169 827 | 8/2005 |
| EP | 1 672 570 | 6/2006 |
| GB | 2 368 419 | 5/2002 |
| GB | 2 368 672 | 5/2002 |
| GB | 2 368 673 | 5/2002 |
| GB | 2 368 674 | 5/2002 |
| GB | 2 368 675 | 5/2002 |
| GB | 2 390 445 | 1/2004 |
| WO | WO 99/54127 | 10/1999 |
| WO | WO 00/33158 | 6/2000 |
| WO | WO 00/54123 | 9/2000 |
| WO | WO 00/57321 | 9/2000 |
| WO | WO 00/64110 | 10/2000 |
| WO | WO 01/16827 | 3/2001 |
| WO | WO 01/25910 | 4/2001 |
| WO | WO 01/35277 | 5/2001 |
| WO | WO 01/37145 | 5/2001 |
| WO | WO 01/48664 | 7/2001 |
| WO | WO 01/58242 | 8/2001 |
| WO | WO 01/59679 | 8/2001 |
| WO | WO 01/61593 | 8/2001 |
| WO | WO 01/65353 | 9/2001 |
| WO | WO 01/71520 | 9/2001 |
| WO | WO 01/75683 | 10/2001 |
| WO | WO 01/86545 | 11/2001 |
| WO | WO 01/97067 | 12/2001 |
| WO | WO 02/03232 | 1/2002 |
| WO | WO 02/17108 | 2/2002 |
| WO | WO 02/27628 | 4/2002 |
| WO | WO 02/42878 | 5/2002 |
| WO | WO 02/50750 | 6/2002 |
| WO | WO 02/096014 | 11/2002 |
| WO | WO 03/044718 | 5/2003 |
| WO | WO 2004/001996 | 12/2003 |
| WO | WO 2004/081831 | 9/2004 |
| WO | WO 2005/050366 | 6/2005 |
| WO | WO 2006/025704 | 3/2006 |
| WO | WO 2006/050751 | 5/2006 |
| WO | WO 2006/055746 | 5/2006 |

* cited by examiner

| | |
|---|---|
| 1 Getting Started | |
| 2 Check for Duplicate Ideas | |
| 3 Idea Coach | |
| 4 Check Costs Database | |
| 5 Employee to Employee Help | |
| 6 Resource Contact | |

Step1 → Step2 → Step3

Cost Service Improvement
Comparative Analysis

Ⓐ Describe the current practice?

Ⓑ Describe Your customer service improvement idea?

Ⓒ Did this idea come about as a result of a complaint?

○ Yes
⦿ No

Ⓓ If yes, please describe the complaint and it's frequency?

Ⓔ How woud you measure the impact of this idea (methods, tools etc)?

Ⓕ Are there any potential drawbacks to your idea?

Ⓖ Shoud customers be notified of this customer service improvement once the idea has been implemented? If yes, please list the customers here.

Attachment    Go to Next Step ➡

Worklife Comparative Analysis

Sidebar:
1. Getting Started
2. Check for Duplicate Ideas
3. Idea Coach
4. Check Costs Database
5. Employee to Employee Help
6. Resource Contact Step1    Step2    Step3

Ⓐ What is the current practice?

Ⓑ Describe your worklife at MDS idea?

Ⓒ How would you measure the impact of your idea?
(ask an idea Coach for help or contact the H/R department through the Resource Contact tool.)

Attachment    Go to Next Step ▶

FIG. 3E

New Product or Service Comparative Analysis

Sidebar:
1. Getting Started
2. Check for Duplicate Ideas
3. Idea Coach
4. Check Costs Database
5. Employee to Employee Help
6. Resource Contact Step1 > Step2 > Step3

Ⓐ Describe your new product or service?

Ⓑ What is your target market?

Ⓒ What is the estimated size of the target market?
$ [        ] (You could ask an idea Coach for help with this.)

Ⓓ What are the estimated sales for the first year?
$ [        ] (Use idea tools to assist you.)

Ⓔ Do you see any potential problems or challenges with this new product or service?

Ⓕ Does your idea require regulatory or government approval?
(Use Resource Contact tool to contact Regulatory affairs.)

Ⓖ Does a similar product or service exist elsewhere?
⦿ Yes  ○ No
If yes, please list the similar product(s) or service(s) and list the manufacturer or provider.

Product or Service       Manufacturer or Provider

Attachment    Go to Next Step ➤

Customer Service Improvement
Financial Analysis

Step1 → Step2 → Step3

*Fill in categories that apply to your idea.

| | |
|---|---|
| 1 | Getting Started |
| 2 | Check for Duplicate Ideas |
| 3 | Idea Coach |
| 4 | Check Costs Database $ |
| 5 | Employee to Employee Help |
| 6 | Resource Contact |

Ⓐ Current costs before my idea   12 months
$
$
$ (-) minus

Ⓑ Ongoing costs of my idea   12 months
$
$
$ (+) plus

Ⓒ New revenue generated
by my idea   12 months
$
$
$ (-) minus

Ⓓ One time implementation
costs of my idea   12 months
$
$
$ (-) minus

Ⓔ Capital required to make my
idea happen   12 months
$
$
$

Financial value of idea = Ⓐ - Ⓑ + Ⓒ - Ⓓ - Ⓔ

Attachment   Go to Next Step →

FIG. 8

Implementation Analysis

Step1 ⟩ Step2 ⟩ Step3 ⟩

Sidebar:
1. Getting Started
2. Check for Duplicate Ideas
3. Idea Coach
4. Check Costs Database
5. Employee to Employee Help
6. Resource Contact Ⓐ Describe the process of implementation in steps (i.e. trial/pilot, rollout to a limited number of sites or departments, full implementation across the company, additional employees, special equipment, outside expertise or subcontracting, etc)

[text box]

Ⓑ What are the non financial costs associated with implementing your idea? (Use Resource Contact tool to contact Operations Department or check Cost database in idea Tools)

[text box]

Ⓒ What are other potential benifits associated with this idea?

[text box]

Ⓓ Who do you think should oversee this implementation?

| Name | Title | Email | Phone |
| --- | --- | --- | --- |
| | | | |
| Name | Title | Email | Phone |
| | | | |
| Name | Title | Email | Phone |
| | | | |

Ⓔ Estimated time required for implementation: [____] weeks

⟨ Attachment ⟩ ⟨ Go to Next Step ➔ ⟩

FIG. 9

Evaluation Response Form test

Forward Idea
All non-approval responses or requests for additional information must be accompanied with an explanation Response:
- ⊙ I approve this idea (to implementer)
- ○ I need more information
  (to idea generator)
- ○ Non-approve Evaluation deadline date: 12/13/2001

Response form #: 1

( View Idea )

Notes & Explanation:

In order for this idea to be approved, the implementer must agree with all aspects of the idea and must agree to implementing the idea by the suggested implementation date, or one of His/Her choosing.

Implementer(s): [ ]  ( Add Implementer )

Implementation target date: 12/13/2001

A. Enter current costs or new/increased revenue in the following boxes:

| Cost Center | FTE Impacted | Revenue Impact | Expense Category | Amount |
|---|---|---|---|---|
|  |  |  |  |  |
|  |  |  |  |  |
|  |  |  |  |  |

B. Estimated cost of implementing this idea:

| Cost Center | FTE Impacted | Revenue Impact | Expense Category | Amount |
|---|---|---|---|---|
|  |  |  |  |  |
|  |  |  |  |  |
|  |  |  |  |  |

[ Submit evaluation ]

( Attachment )

FIG. 10A

Implementation Response Form
test
Forward Idea
(from implementer to evaluator)

All implementation responses or requests for additional information must be accompanied with an explanation.

<View Idea>

Response:
- ⦿ I accept this implementation
- ○ I need more information
- ○ Non-implement Response form # and history: [1]

Implementation deadline: [12/13/2001]

Notes: [                    ]

In order for this idea to be approved, the implementer must agree with all aspects of the idea and must commit to implementing the idea by a specific date.

Implementation date suggested by evaluator: [12/13/2001]

Implementation date committed to by implementer: [12/13/2001]

A. Enter current costs or new/increased revenue in the following boxes:

| Cost Center | FTE Impacted | Revenue Impact | Expense Category | Amount |
|---|---|---|---|---|
|  |  | 0 | 0 | 0 |
|  |  | 0 | 0 | 0 |
|  |  | 0 | 0 | 0 |

B. Enter estimated cost of implementing this idea:

| Cost Center | FTE Impacted | Revenue Impact | Expense Category | Amount |
|---|---|---|---|---|
|  |  | 0 | 0 | 0 |
|  |  | 0 | 0 | 0 |
|  |  | 0 | 0 | 0 |

[Submit post-implementation]

<Attachment>

FIG. 11

Idea Evaluation Decision
test
Forward Idea
(from evaluator to author)

( View Idea )

After careful evaluation, your idea has been:   Award Level/Points: [3000]
◉ Approved as is
○ Approved with modifications
○ Non-Approved Modify the Level
[Level 1-3000 ▼]

Comments & Explanations:
[                                    ]

[Submit]

( Attachment )

FIG. 12

IDEA MANAGEMENT

CROSS REFERENCE TO RELATED APPLICATIONS

This application is a continuation-in-part application of U.S. patent application Ser. No. 09/375,401 filed on Aug. 17, 1999 now abandoned entitled "Employee Proposal Management System and Method" which claims priority from U.S. provisional patent application Ser. No. 60/144,877 filed on Jul. 20, 1999.

TECHNICAL FIELD AND BACKGROUND ART

The present invention relates to idea submission methods and computer systems for idea submission and development.

It is known in the prior art to provide an idea box for manual submission of an employee's idea. Further, it is known in the art to employ computers which are coupled together to submit comments or ideas to business management and for business management to respond to such comments and ideas. Such systems simply employ e-mail and the comments and ideas are submitted to a business manager for review.

These prior art systems fall short of providing a cohesive system for formulating, reviewing, and implementing an idea. Further, such prior art systems fail to provide a systematic methodology for routing ideas through the network to appropriate reviewers and implementers based upon content and workflow criteria. In the prior art, ideas are either submitted to a central computer repository where users of the system may look at submitted ideas or the prior art systems rely on manual human intervention and decision making in determining where the idea should be routed.

SUMMARY OF THE INVENTION

In a first embodiment of the invention there is provided a system, method and computer program product for idea management and development of a structured idea. The methodology includes obtaining a structured response over a computer network from an employee of a business. In certain embodiments of the invention the system and method may be employed without the use of a computer network. The structured response is developed through a series of templates in which the employee enters information into a template. From the responses in the first template a second template is selected. For example, the first template may inquire as to the idea type which is selected from a selection of idea types. Based upon the idea type selected, a second template is provided by a server to a processing device of the employee. The second template may request information regarding the financial consequences of implementing the idea. Once the structured idea is developed through the series of templates a routing decision is made by the server. The server determines one or more members of the business management to route the idea to. In such an embodiment, an idea log which contains all submitted information in the templates is sent via the computer network to the one or more members of the business management. In other embodiments, the routing decision causes the server to send a message to the business management that they have been selected to evaluate the submitted structured idea of the employee. The routing decision is made in part based upon information that is presented in the templates by the employee.

In one embodiment the selection of templates by the server may be based upon the selected type of idea/proposal. Examples of idea types include but are not limited to: cost saving, revenue generation, quality improvement, safety improvement and policy change. In completing the templates, the employee is provided with various resources including access to a cost database. The cost database may be accessed through the financial template in order to assist in determining costs that will contribute to the implementation of the idea. By entering all of the costs and possible benefits, the server automatically calculates the financial impact of implementing the idea. Other entries that may trigger selection of a template by the server include, the selected department of the business that the idea will affect, the type of proposal selected, whether the proposal is a group proposal, or whether the proposal will have financial consequences.

In the event that the financial information is not present in the cost database for a particular item, the employee may send a message to the server requesting that the additional information is provided. The server will then route the request to the proper department such as accounting in order to obtain the information. Decisions may be made about the requested information based upon the employee's log in information. If the employee is aware of the financial information or receives a response with the information provided by the accounting or other department, this financial information will be automatically added to the cost database for future users of the idea management system.

The process of routing the idea or contacting business management to review the idea may be based in part upon the group within the business that the employee has indicated will benefit from the idea. Routing may also be based on other criteria entered in the templates such as: whether the employee indicated that the idea submission will have a financial benefit, whether the idea is a team suggestion, the idea type that is selected, the workload of the business management, information about the employee who submitted the idea such as the department that the employee works in or any time limits for example.

In another embodiment in which a third template is provided to the employee by the server, the employee is queried regarding the implementation process and asked to enter the names of potential implementers. Routing in turn may be based upon the one or more implementers that are selected by the employee.

After information has been gathered at the server such that there is a structured idea submission the information is then routed. The business management that either, approve, disapprove or request additional information about the idea are contacted and provided with evaluation templates. The business management can then check the entries that are made by the employee regarding the various costs and the financial impact of the idea that the employee has submitted.

In certain embodiments there may be more than one level of review of the idea. In other embodiments at each stage of the review process the employee is contacted through e-mail and informed of the progress of the idea submission status. The idea submission is generally stored in an idea log in a memory location associated with the server. The idea log contains all of the information that has been submitted to the server for the idea submission by the employee and any of the business management that have reviewed the idea and may also include such time and date information regarding the review process, and the status of the idea. The idea log may be requested by any party involved in the idea management process and sent to a processing device of the party for display.

At each stage in the development of the idea, timers may be employed. Upon expiration of a timer, the person that is required to give a response or to add additional information will be contacted by the server and sent a reminder communication.

BRIEF DESCRIPTION OF THE DRAWINGS

The foregoing features of the invention will be more readily understood by reference to the following detailed description, taken with reference to the accompanying drawings, in which:

FIGS. 3A-3H show various comparative analysis templates wherein each template has a different series of fields that require data entry by the employee;

FIG. 8 is a representation of the financial information template;

FIG. 9 is a representation of the implementation template;

FIG. 10A is a sample template that is provided to an evaluator;

FIG. 11 is a sample template that is provided to an implementer;

FIG. 12 is a sample template that is provided to a decision maker;

DETAILED DESCRIPTION OF SPECIFIC EMBODIMENTS

Definitions. As used in this description and the accompanying claims, the following terms shall have the meanings indicated, unless the context otherwise requires: the term "business" as used herein shall apply to all organizations including both for-profit, non-profit organizations and may be associated with clients of an organization including customers and suppliers. The term "business management" as used herein shall apply to evaluators, implementers and decision-makers of an idea submission and is not strictly limited to a particular level of management of a business. The term "employee" shall refer to an individual submitting an idea and may be any user of the system who submits an idea including business management, clients, customers, and suppliers of the business. The term "template" as used herein shall refer to forms on any media which have one or more locations for the entry of information. Templates include electronic forms which are computer readable and displayable. As used herein the term "financial impact item" shall refer to a cost associated with an item that is not present in the cost database of the system. The cost may be obtained in a manner other than through retrieval from a cost database either by making a request to a group or division having knowledge on the item or through a request to the accounting department. The term "financial information" as used herein shall refer to a cost associated with an item and may include accounting codes and other identifiers of the association of the item to the cost. As used herein the term "routing" shall refer to the determination of at least a destination address and any intermediate addresses that are necessary in a computer network. In embodiments, in which the system and method are applied without the use of a processor, routing refers to the determination of the next person(s) that are to receive the idea submission. As used herein the term "routing decision" or "network routing" refers to the destination address and not necessarily to the information about an employee's idea, but only a destination that is to be contacted via internal messaging or through an integrated electronic mail system. The terms, "submission" and "proposal" are used interchangeably herein to refer at least to the information that is provided by an employee regarding an idea for improvement of the business.

Figure 1:
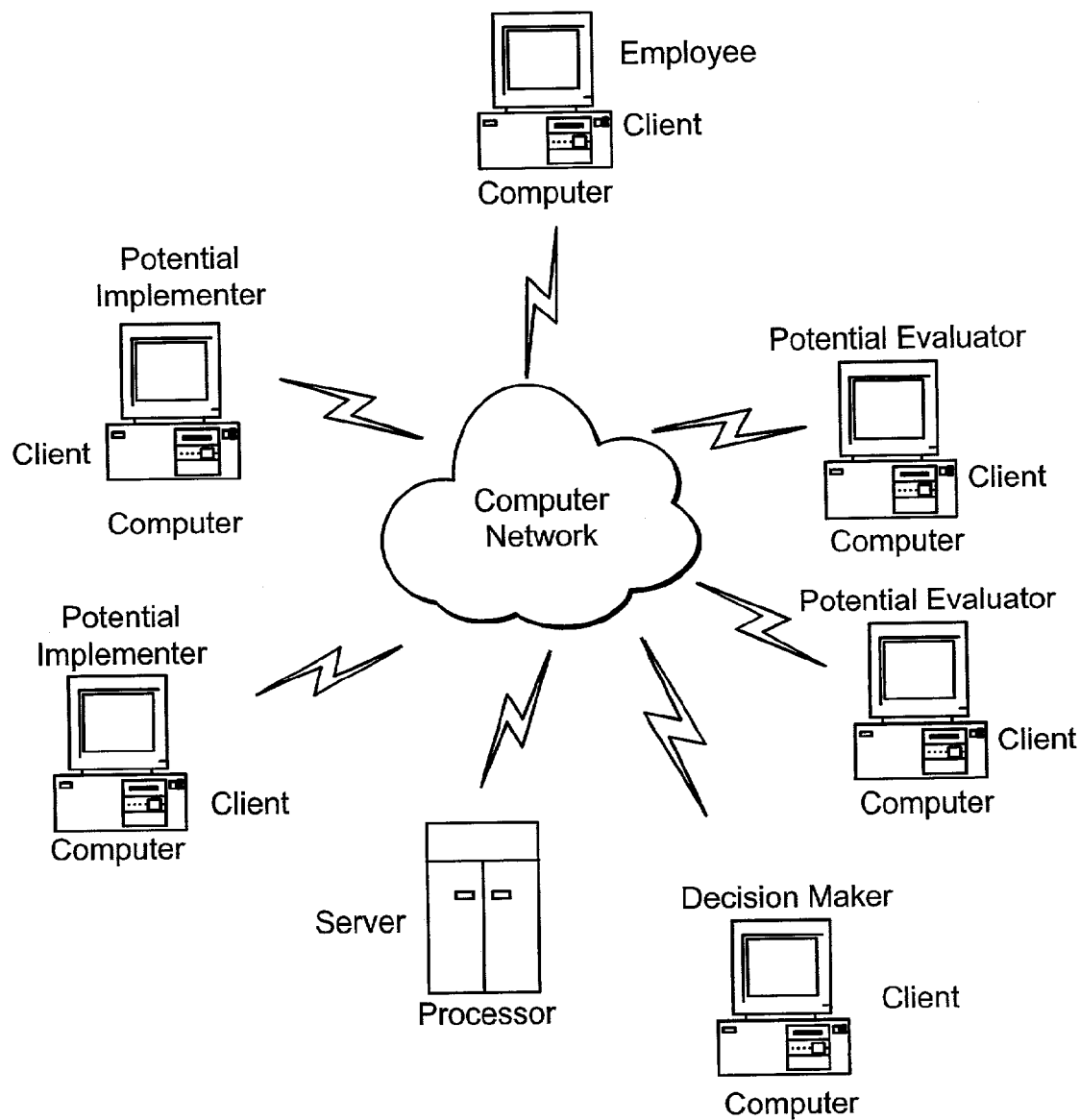
FIG. 1 is an environment for implementing systems and methods for idea management according to one embodiment of the invention.

FIG. 1 is an environment for implementing systems and methods for idea management according to one embodiment of the invention. The following system and method are generally implemented in a client/server architecture in which a processor/server interacts with a processing device of an employee through a computer network. Information is transferred in two-way communication between the client and the server. It should be understood by one of ordinary skill in the art that the network that the system may be implemented in may include, local area networks (LANs), wide area networks (WANs) and may include networks such as the internet and the World Wide Web.

Figure 2:
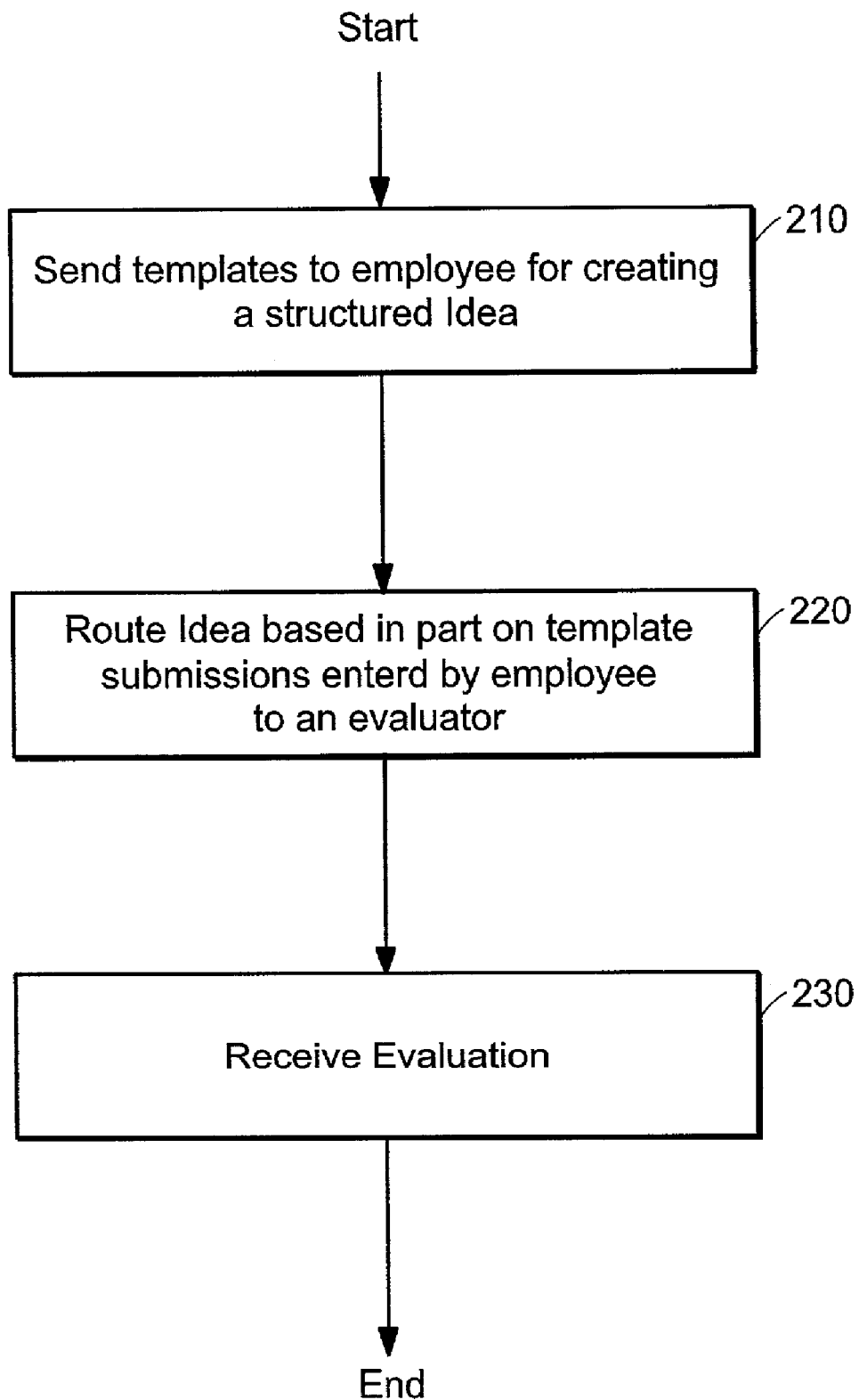
FIG. 2 is flow chart that generally shows the steps used for idea management in a client server environment.

The server of the embodiment of FIG. 1 performs the method of the flow chart of FIG. 2. The server sends a series of templates to a processing device associated with an employee who is developing an idea (Step 210). The templates are created to illicit an idea in a structured manner submission of an idea may be kept confidential. In such embodiment the employee has an associated code/name for accessing an idea log which is contained in memory associated with the processor. The server/processor may store the employee's information and make an association with the associated code, using this information to send messages to the employee, however it can be requested (selected by user or manager) or configured that no personal information will be shown or sent to other parties involved in the idea development, review and implementation process. The first template captures the type of idea and allows the employee to express the idea as a written description. The second template captures the financial consequences of the idea and the third template captures the implementation details of the idea. Once the idea has been developed in this structured manner, the server processes the information that is received in the templates and makes a routing decision based at least on information that is submitted by the employee (Step 220). The routing of the idea may be based on, for example, the type of idea and the group/division of the business affected. Once a routing decision has been made, information is passed to at least one party (evaluator) that will make a decision about implementation of the idea. The information that is gathered in the templates from the employee may be selectively provided to the evaluator. For example, the evaluator may be sent a message which indicates that an idea has been submitted and the party has been selected as a reviewer of the idea. The server then allows the evaluator access to the idea which is stored in memory associated with the server and also provides a template to the evaluator. In other embodiments, the information may be reformatted to provide a business case format to the evaluator of the idea submission. A business case format includes not only the financial elements, but additional material such as that which are provided in an idea log as described below with respect to FIG. 4 including the names of all other evaluators and their decisions if already made along with potential implementers of the idea and other factors which effect the implementation of the idea.

In a preferred embodiment, the evaluator may select to approve the idea, disapprove the idea or request more information. The server receives this information and evaluates the information based upon the decision (Step 230). The server may then send a message to the employee who formulated the idea which contains the decision of the evaluator. It should be understood that the decision making process may require multiple evaluators. For example, there may be an initial evaluator, a pre-implementation evaluator and a final decision maker, all of whom are part of the overall decision making process. Such an embodiment is elaborated on in FIG. 2A.

Figure 2A:
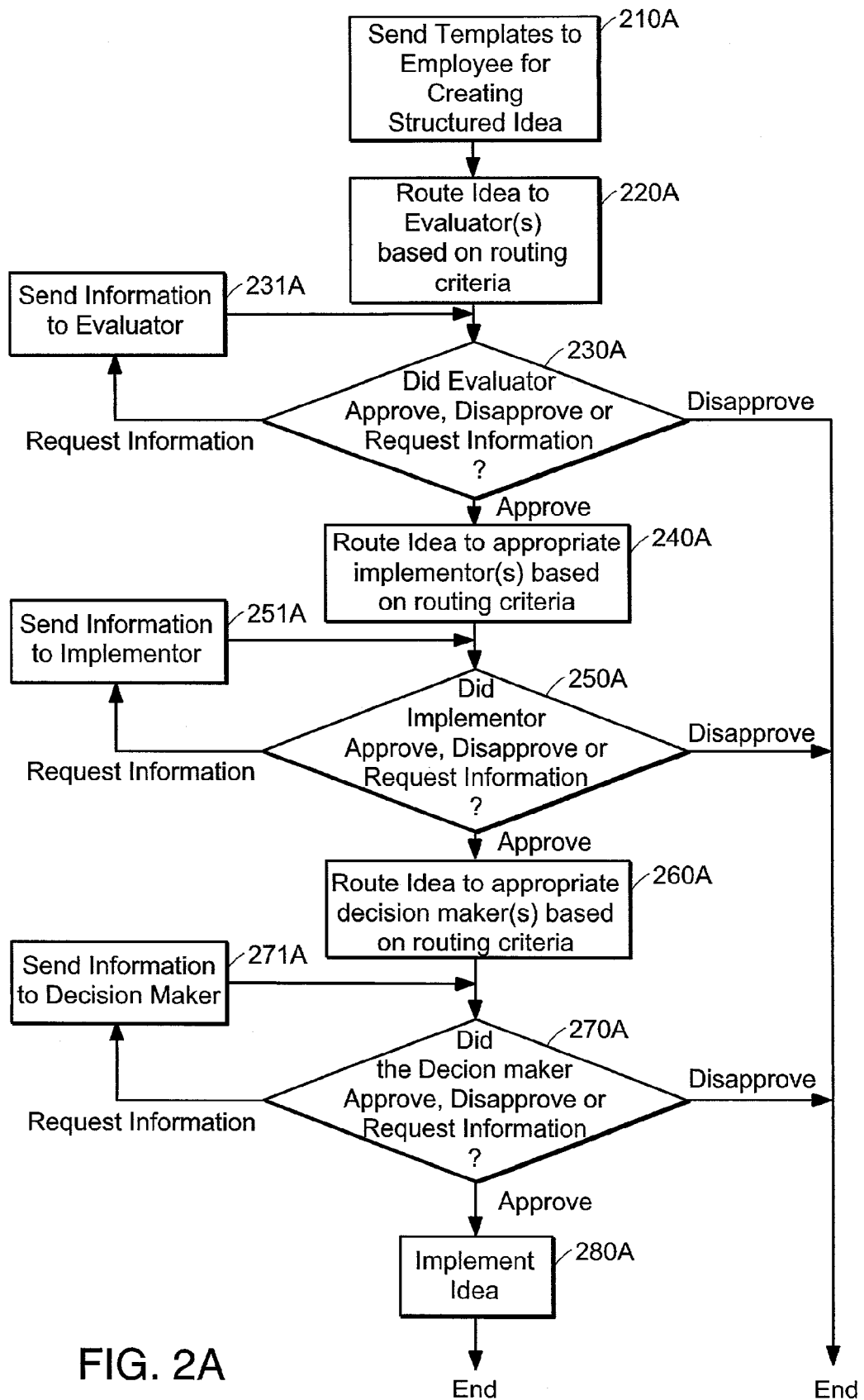
FIG. 2A is a more detailed flow chart of FIG. 2.

In FIG. 2A, an employee of a business who has an idea or suggestion for improvement of the business makes a request to begin development of the idea over the computer network to the server/processor. A series of templates are then sent to the employee over the network for development of the structured idea submission (Step 210A).

The processor first sends a template to the employee providing for employee identification. Once the employee is recognized and authenticated by the processor through a log-in process the processor provides an idea fundamental template to the employee. The idea fundamental template allows the user to enter information about the idea and allows the employee to identify the type of idea which is selected from a group of categories. It should be understood by one of ordinary skill in the art that each template that is provided to the employee is designed for entry and submission of information. The information is entered and coupled with an identifier so that the information may be sent in a format that the server may process. In one embodiment of the invention, the computer network is the Internet and the template is created such that it may be displayed in a web browser. It should be understood by one of ordinary skill in the art that the template may be XML, DHTML, HTML or another type of displayable document which is operable with a web browser.

The employee then transmits the information to the processor. Based in part upon the type of idea that is selected the employee further develops the structured idea through a series of templates which are tailored to the specific type of idea. The employee refines the idea to include the financial consequences of implementing the idea as well as elaborating on the requirements for implementing the idea.

Once the employee has completed the series of templates and the information entered into the templates is sent to the processor, the processor makes routing decisions based upon routing rules(Step 220A). The decisions include which department or departments the employee idea should be routed to and to whom in those departments the idea should be sent.

Routing of the idea may be based upon routing policies which are stored in the server. These policies may be established by the business management prior to the routing of an idea. The policies may be based upon organizational conditions, based upon template entries or a combination of both. For example, one organizational condition might be that all employee ideas are routed to the employee's superior or to the department manager. An example of routing based upon a template entry is sending the idea submission to the head of the department that was indicated by the employee as the department to be affected on the idea fundamental template. An example of the combination of both organizational conditions and the template entries might be routing the idea to a potential implementer selected by the employee based upon the workload of the implementer during the time period for implementing the idea. In such an embodiment, the server would eliminate implementers based upon the implementer's availability.

As such routing may be determined based upon a criteria set which includes data from the submitted idea and also organizational conditions. Some criteria which may be used for routing which is gathered from the templates are the department affected, the origin of the idea, the type of idea, and any time limits for implementation or responding. In the preferred embodiment at least two criteria are used for determining the routing of the idea. A further example of a routing rule is determining an evaluator from group of evaluators by rotating the selection of the evaluator each time a new idea is presented.

The idea is then sent through the network to at least one member of the business's management of the identified department so that the idea may be evaluated. Based upon the type of idea, the business management, also known as an evaluator, is provided with one or more templates which include the information that was developed for the employee's idea. The business management can then make a decision whether to approve the idea, not approve the idea or request additional information regarding the idea (Step 230A). If the idea is approved, the pre-implementation phase is begun. The processor then determines the next person or persons to whom the idea will be routed (Step 240A). One or more templates are sent to the employee(s) of the business who would most likely be involved in implementing the employee's idea. The implementers then evaluate whether the idea is feasible and whether any benefit would actually result for the company. Based upon the decision by the implementer(s), the idea is either approved for implementation, not approved or more information is requested of the employee (Step 250A). The idea submission is then routed to a decision maker within the business (Step 260A). If not decided at this level, the idea can be routed based upon routing criteria which may include workload of the various decision makers as well as the type of idea and the department that the idea will affect. The decision maker benefits from the information which is added by the evaluator(s) and the implementer(s) who have reviewed the idea and checked the financial impact of the idea. If at any point in the idea process, the idea is rejected the employee is informed and the process ends. The decision maker like the implementer and evaluator has the ability to approve, reject or request information (Step 270A). If the employee's idea is to be implemented, the implementation follows based upon the proposal in the submission of the employee and any additional suggestions which have been provided by the evaluators, or decision makers implementers (Step 280A). If information is requested at any stage in the process, the server sends a message to the employee requesting information. The employee may then enter information into a template, which is then sent by the server back to the appropriate evaluator, implementer or decision maker respectively (Steps 231A, 251A, 271A).

Each time a template is presented and information is entered into the template in the pre-defined fields, the information is translated into a data stream which includes delimiters for the response for each field. The data stream is addressed and sent to the processor through the computer network and parsed by system rules or in case-specific ways by the processor. Based upon the parsed information, the server can then use portions of the parsed information to determine the type of template that needs to be presented along with determining the identity of who should be evaluating the idea and the address/routing information for sending a message or the information from the templates (the structured idea) to the identified evaluator.

It should be recognized that the foregoing system is more than an idea submission system, as the system provides for refinement of an idea, routing of the idea to business management, evaluators, and decision makers based upon a criteria set, and development of an implementation based in part upon financial consequences and workload of other employees who may be involved in implementing or evaluating the idea.

Figure 3:
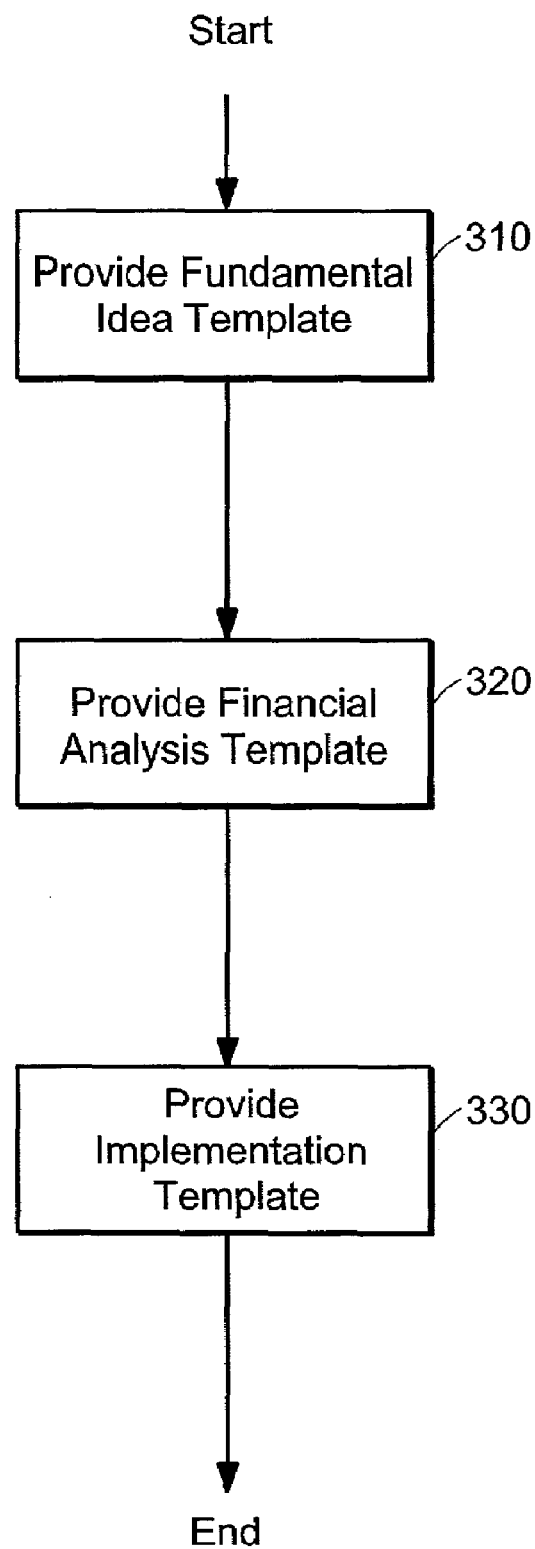
FIG. 3 is a flow chart that shows the steps for creating a structured idea of an employee using templates.
Figure 3A:
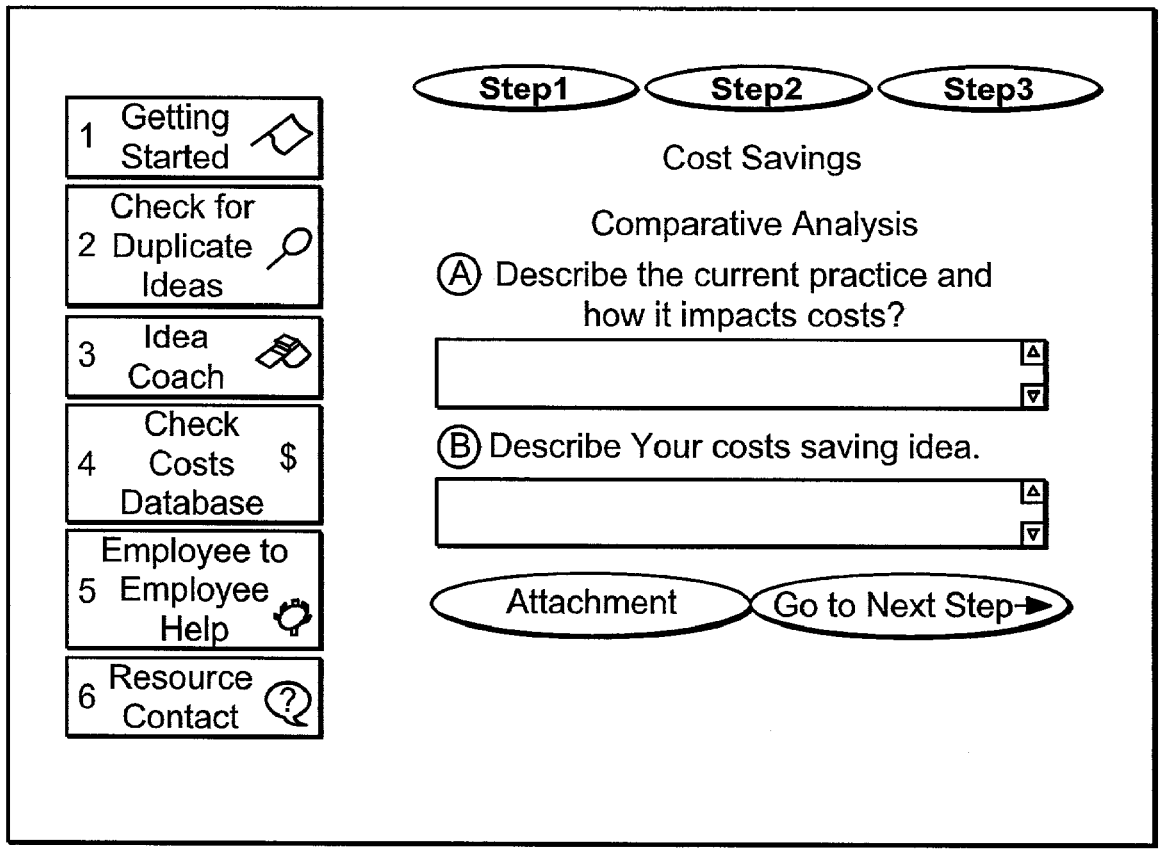
Figure 3C:
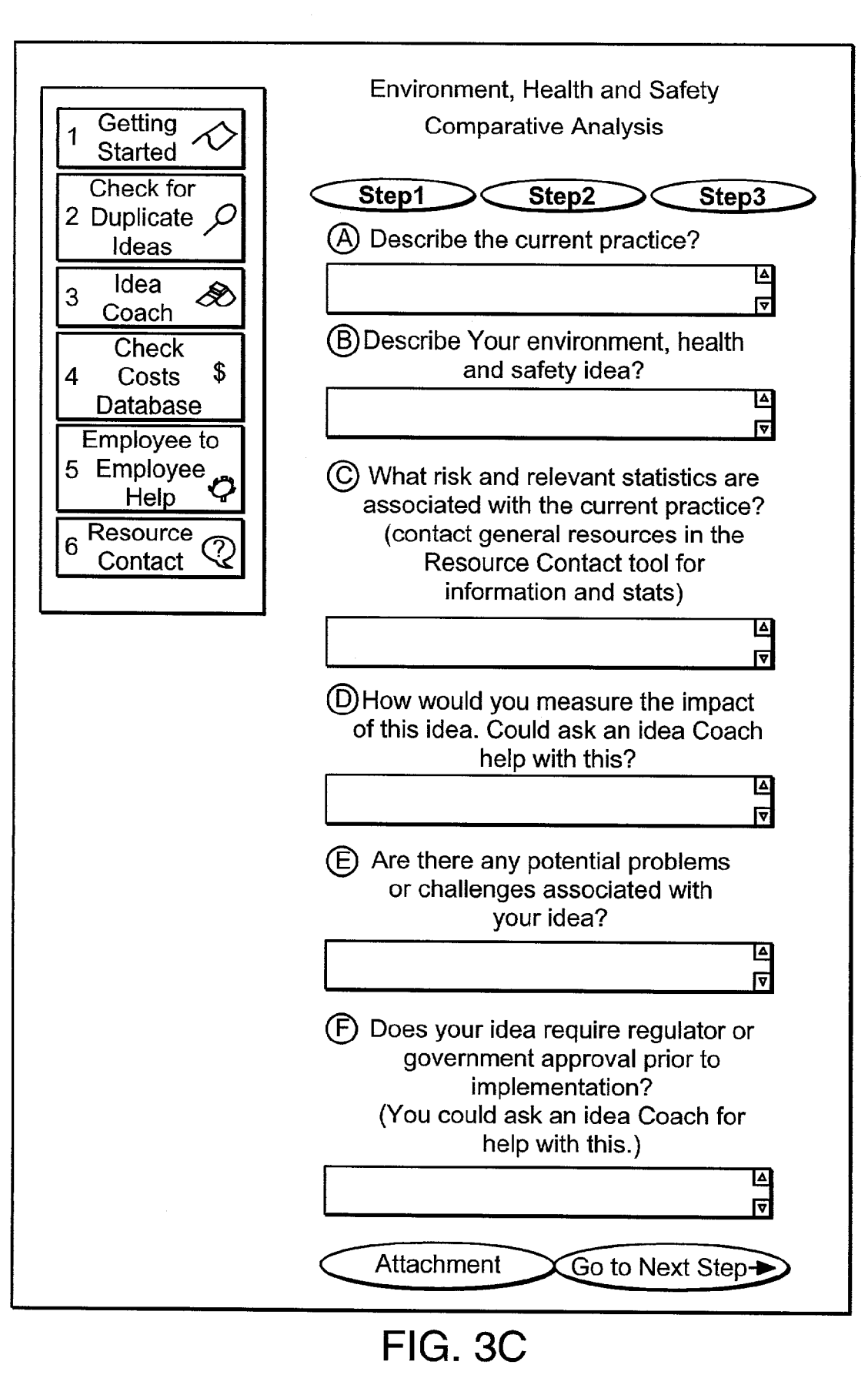
Figure 3D:
Figure 3F:
Figure 3H:
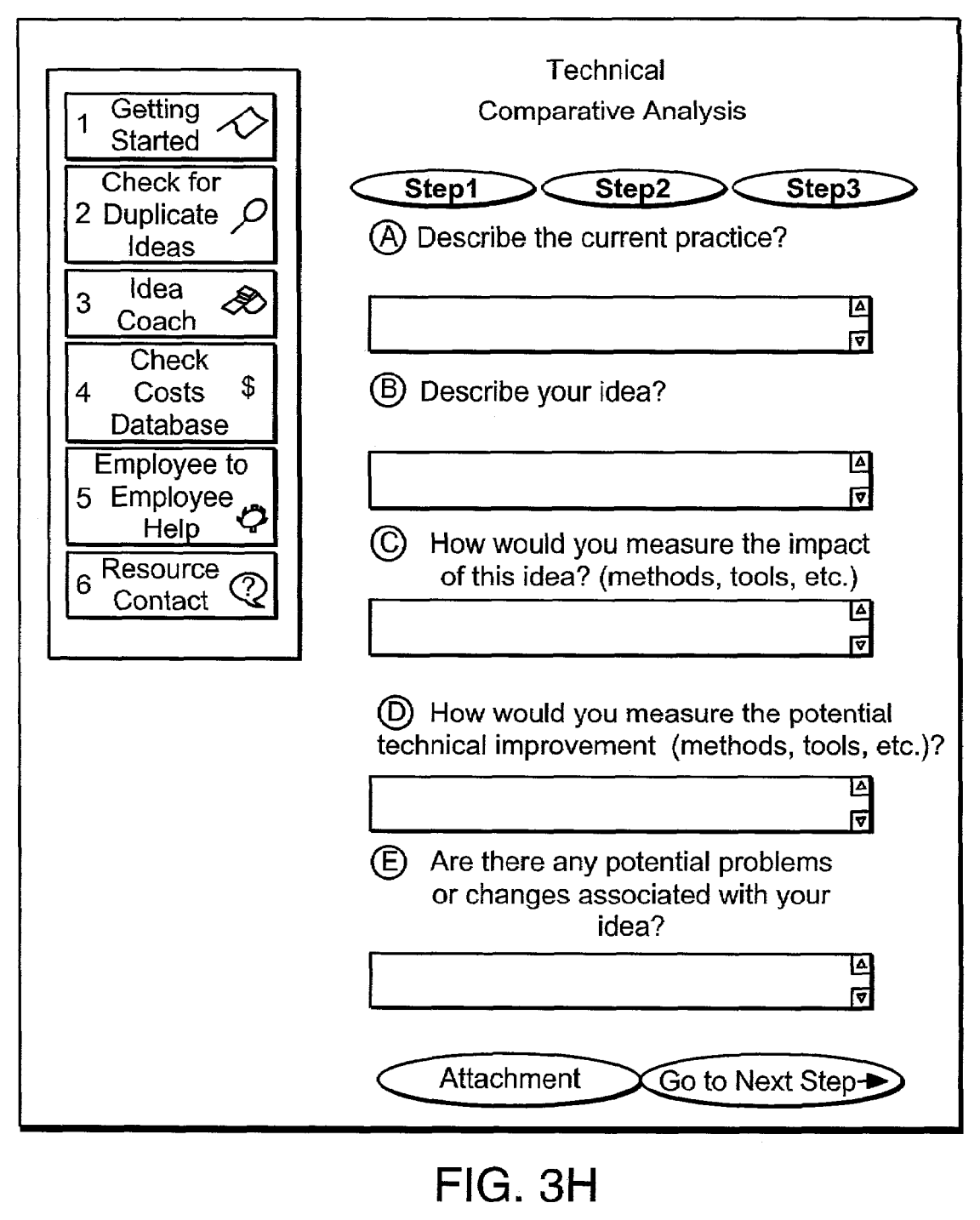

FIG. 3 is a flow chart which shows a three step process which is used for development of an employee idea. After logging into the server and proceeding through an authentication process, an employee is provided with a template for outlining the suggested idea (Step 310). The employee may through a written description define what the idea is and provide a title for the idea. The template, at a minimum, requires that the employee classify the idea into one of a plurality of categories. Potential categories include, but are not limited to cost savings, revenue generating, quality improvement, safety improvement, customer service improvement, development of a new product, and new company slogan. The template allows the employee to identify if the idea will have a financial impact and also the departments of the business that are to be affected by the idea. This information may be gathered on a single template or through multiple templates. In one embodiment, a second template is provided which allows an employee to enter a comparative analysis of the method that was previously implemented if the idea is a new method or procedure. The employee is queried as to the impact of the method and the potential drawbacks of the method. The template that is selected by the server and then sent to the employee for comparative analysis may be selected based on the idea type chosen in the idea fundamentals template. FIGS. 3A-3H show various comparative analysis templates wherein each template has a different series of fields which require data entry by the employee. Each template is based upon a different selected idea type.

After the general information template is completed, the information is forwarded through the computer network to the processor and the processor processes the information in order to determine the next template to send to the employee. Based upon the information which is sent to the processor which was entered by the employee in the template, the processor accesses a look-up table and compares the received information with the look-up table to select the next template to send to the client processing device. For each entry entered into a template by an employee, a new template may be assigned from a plurality of pre-configured templates. The processor determines the new template to send based upon the type of idea that is selected by the employee and also on whether the idea will have financial consequences.

If the employee indicates that the idea will have financial consequences, the processor then provides a financial information template to the employee (Step 320). The financial information template queries the employee as to the cost of the original method, the cost of the new method, whether revenue will be generated by the new method, the cost of implementing the new method and the capital required for the idea. Based upon the information provided by the employee, the processor can then determine the overall financial impact of the idea. During the process of entering information into the template, the employee is provided with access to a cost database. By selecting the cost database on the template, a new document is provided to the employee by the server which contains data listings of various costs from the cost database. For example, the listings may include costs of material associated with the business, fees for attorneys, manufacturing costs, fuel costs, real estate costs etc. As such, there may be further sub-categories with associated costs which can assist the employee in determining the financial impact of the idea. For example, under the category of manufacturing costs, the subcategories may include, heavy machinery, workers compensation etc.

If a cost is not listed that the employee believes is necessary to determine the financial benefit to the business, the employee has two options. The first is to request the financial information from a financial database or from the accounting department or another source that is coupled to the computer network. By making a request to the server the employee may be granted access to the information or denied access to the financial information based upon some preset criteria. For example, certain employees may have access to certain financial information that other employees would not be privy to, such as, employee salaries. The processor, based upon the request will check whether the employee has access privileges to the financial information. This may be achieved by comparing the employee's log-in information to an access list. If the employee has access privileges the information will be sent to the employee via the server. One such mechanism for sending the information may be through electronic mail. The information may also be provided by sending another template to the employee.

If the employee is denied access to the requested financial information or is capable of obtaining financial information from an outside source which is not part of the idea submission process, the employee can enter this information into the financial information template and the processor will automatically add the information into the cost database so that other employees may have access to that financial information for future idea submissions. Additionally, the added information will be used by the processor for calculating the overall financial impact of the idea. The processor passes the new cost information and associated category identifier and makes a comparison with the available fields within the cost database. The processor may then select an appropriate field for adding the new cost information to the cost database. In other embodiments the employee enters a pre-identified code which is used for determining which field(s) to populate with the cost information in the cost database.

It should be understood that this automatic self-population of the cost database feature may be coupled to any template such that the employee, the reviewers, the coaches, or a resource representative (discussed below) may use this feature.

After the financial information has been entered and the financial impact has been automatically calculated by the processor, a template is provided to the employee from the processor which requests information concerning implementation of the idea (Step 330). Some of the information that may be queried are the recommended steps for implementing the idea, the non-financial consequences of the idea, other potential benefits of the idea, recommended implementers of the idea and an estimated time frame for implementing the idea. This information is then passed back to the processor through the computer network and the information is then stored in a storage location associated with the employee's idea.

Figure 4:
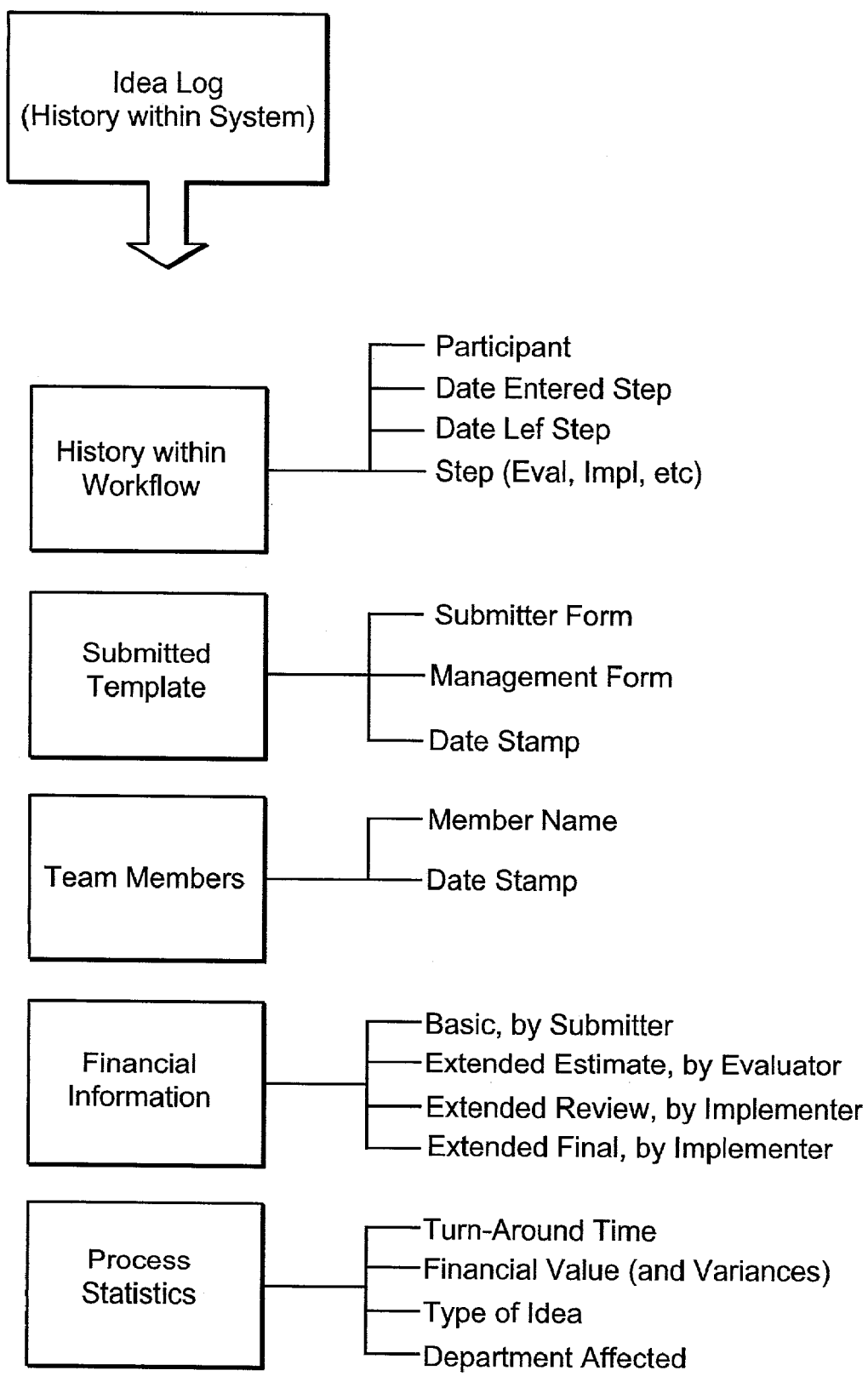
FIG. 4 is a representation of an idea log that shows the information that is contained within the log for storage in memory associated with the server

Upon submission of an idea by an employee, the processor creates an idea log as shown in FIG. 4. Information that is submitted in a template by the employee is stored to memory associated with the idea. This log contains all of the information that has been provided by the employee in the templates and may include the date of submission of the idea and information about the routing of the idea to other members of the business as well as the status of the idea. FIG. 4 shows a sample idea log which contains the history of the workflow of the idea submission (routing), the information contained within the submitted templates as entered by the employee, the identity of the team members if applicable, financial information which is provided by the various parties involved in the idea submission process, and statistics about the idea submission. This information may then be accessed by the employee and may be made private or public to other members of the business.

Formulation of an idea may take more than one session. It should be understood that an employee may save the idea in an idea log which is stored in memory associated with the processor at any stage prior to completion of the templates. The employee may then retrieve the idea and continue to develop the idea. This allows the employee to gather information from various sources before the idea is completed and submitted to the processor for forwarding the idea to business management for review.

In certain embodiments the server maintains the idea log and after an evaluator, implementer or decision maker is determined by the routing criteria, the server sends a message either via e-mail or through another communications mechanism, such as an internal mailing system that an idea has been submitted and may be viewed and retrieved from the server. In such an embodiment, the persons reviewing the idea can make changes to the idea log which can then be viewed by the employee and the other reviewers. In other embodiments, all of the information that is contained within the idea log is passed to the evaluator, implementer or decision maker.

Figure 5:
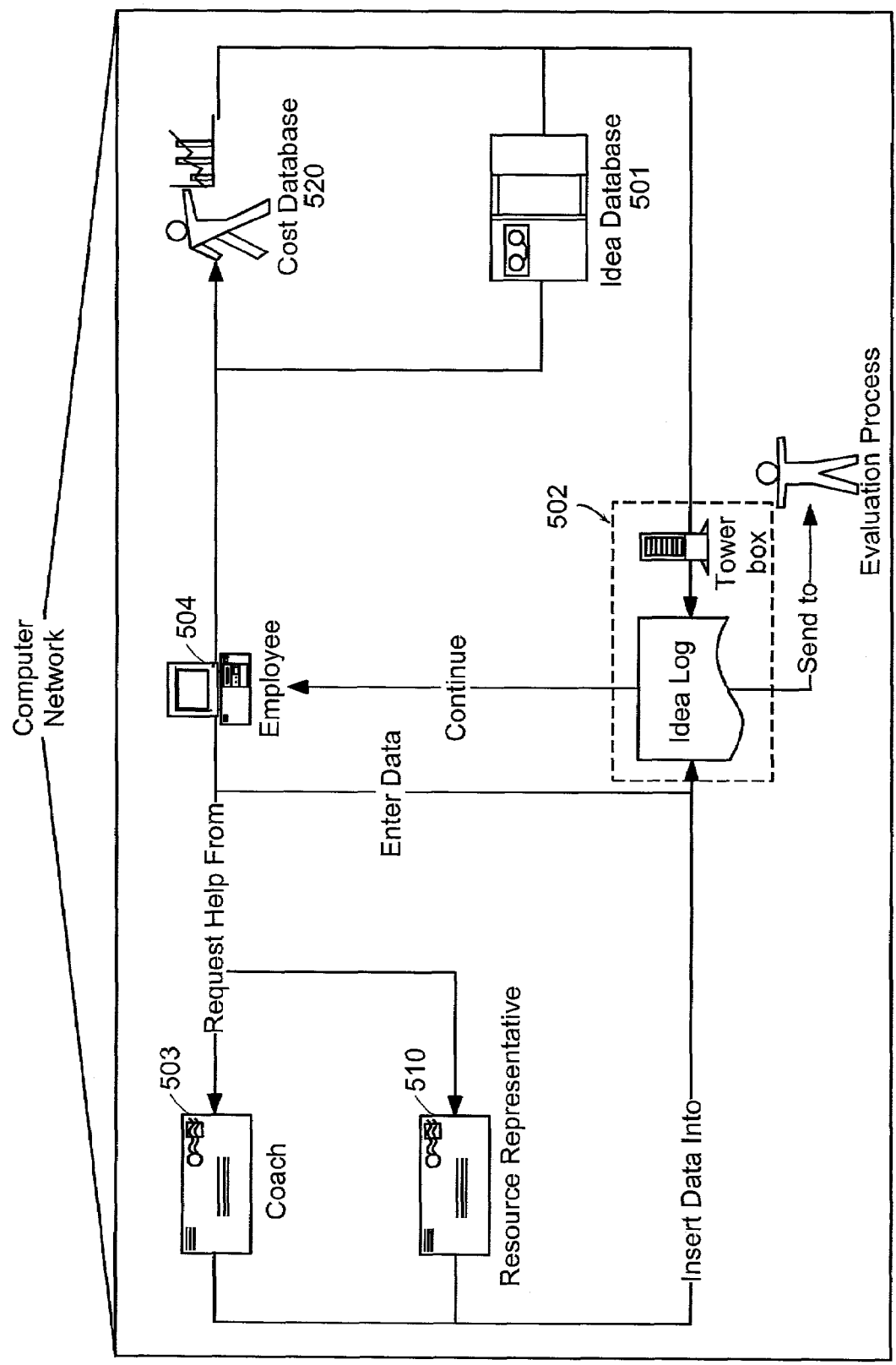
FIG. 5 is a graphical representation of the information sources and research tools that an employee has access to in formulating the structured idea.

During the formulation of the structured idea, the employee has access to multiple information sources for assisting in completion of the templates as shown in FIG. 5. In the preferred embodiment, these tools are available throughout the entire idea process, from formulation of the idea through implementation, and therefore the tools are not directly coupled to a particular template. It should be understood that in other embodiments that the tools could be tailored, as such, so that the tools are only available with relevant templates.

The employee may access an idea database 501 which includes submitted ideas which are designated as public ideas. For clarification, there may be other ideas which are designated as private ideas and are only viewable by business management/other employees who have been granted permission by the employee who originated the idea. If the templates are created using HTML or a similar markup language, the templates can be provided with visually selectable buttons which will send a request to the server for accessing the idea database.

By reviewing other ideas that have been submitted and approved the employee can better formulate responses to the template and can identify if there is duplication of the idea presently being considered for submission. In one embodiment of the invention, upon submission of the initial idea, the server 502 parses the information that is submitted and compares words within the title and the description of the idea to a database in which the title and/or written description of the idea are stored. By comparing words, previous ideas may be identified as being in a similar category or of a similar nature to the presently submitted idea and therefore of more relevance for review by the employee.

Other tools include access to coach. As shown in FIG. 5, an employee who is creating an idea in a specified category can select to correspond with a coach 503 who is familiar with the idea category. By selecting a button or other indicia as to the desire to correspond with a coach 503, a signal is sent from the device on which the template is being displayed 504 to the processor 502. The processor 502 then uses a look-up table or database to find an appropriate coach based upon the specified idea category. Other criteria may be used to select a coach, including the workload of the coach. As such, if there are two or more coaches which are associated with an idea category, the coach having the lesser amount of work will be selected as the coach. Further, routing criteria which have been described above can be used in the determination of the coach. After the coach is identified, the coach is sent a message indicating that the coach should contact the employee submitting the idea. This contact may occur via e-mail, or through a series of templates that are passed through the processor and then to the employee. The system may be configured as a peer-to-peer messaging system. The coach can be provided with a template for addressing the employee and for assisting the employee in fully exploring the presented idea. The processor will pass on the idea log entry for the idea of the employee to a device associated with the coach so that the coach may review the proposed idea to date. Through an exchange with a coach the employee may choose to add information or delete information in the idea log. This exchange may take place instantaneously or may occur over a period of time. This process like all other interactions between evaluators, coaches and other representatives within the business may be done anonymously.

Additionally the employee may send e-mail to a resource representative 510 through selection of button or selector which sends a signal to the processor 502 requesting a resource representative. The processor then sends a template to the employee. The employee selects a department or topic as indicated on the template and enters a question to the resource representative. The system automatically determines the resource representative based upon routing criteria. The message is then forwarded from the processor to the resource representative. The resource representative can then answer the question/message in a template forwarded from the processor. The template allows the resource representative to indicate that information that is contained in the reply to the employee should be incorporated into the cost database 520.

Further, the employee on any of the templates can indicate a time limit for response to the query or the idea. The processor may also be configured to have pre-defined time limits for each phase of the idea submission process. If the time limit for a reply is exceeded, a reminder is then sent by the processor to the individual or individuals who are currently required to provide a response. To this end, the processor maintains within the idea log the person or persons that a request for information or a decision regarding the idea has been sent to along with the time limit/frame for responding to the request. The processor routinely compares the end of the time frame to the current time to see if the system should send the reminder.

Both the coach and the resource representative may be granted complete access to the idea log and therefore can augment the idea directly or the coach and the resource representative can provide the information to the employee and let the employee update the idea accordingly.

Figure 6:
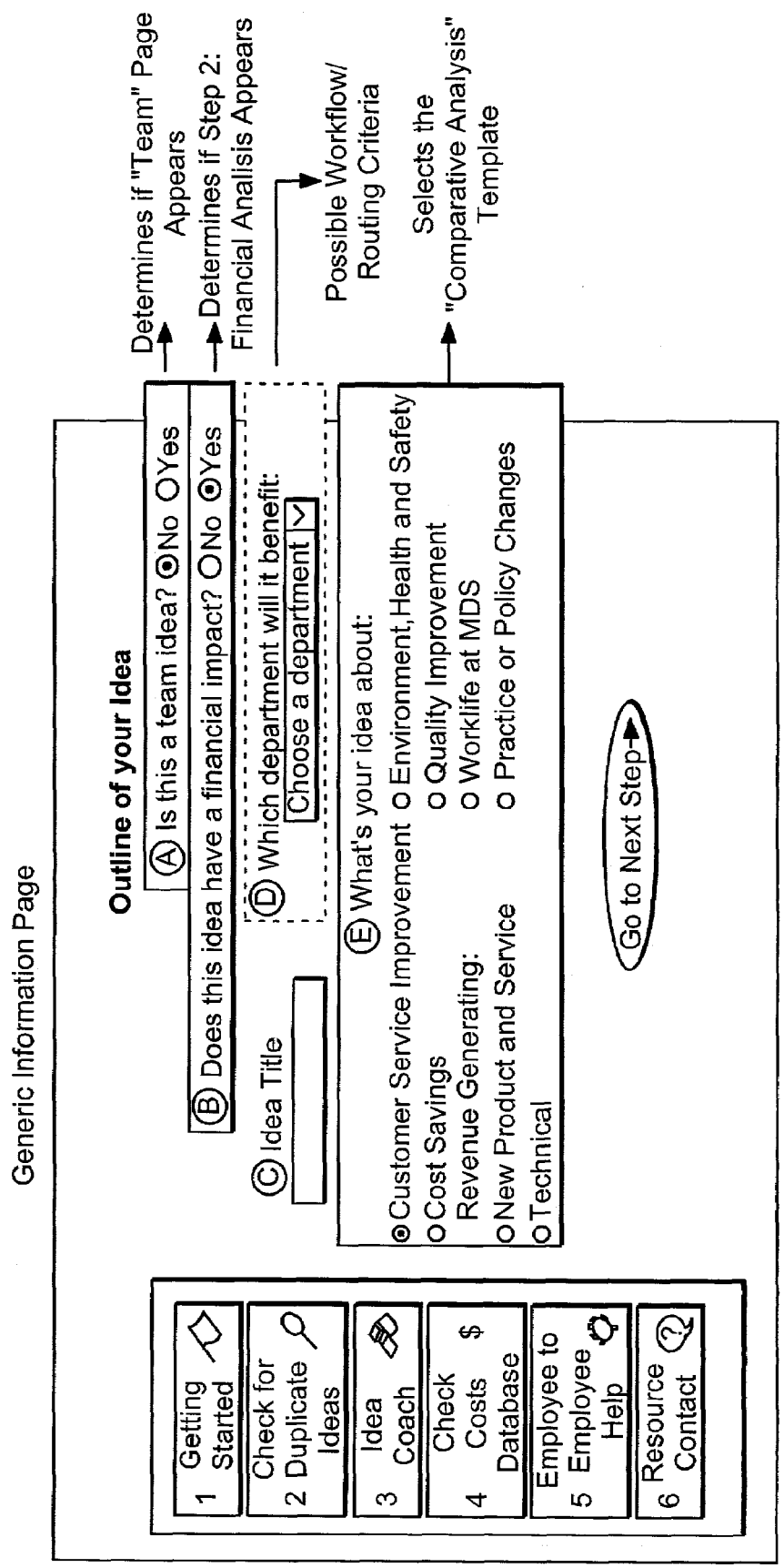
FIG. 6 is representation of the idea-fundamental template that an employee first receives after requesting the creation of an idea log.

The templates will be further described below. The first template that the employee receives after log-in and authentication is an idea-fundamental template as shown in FIG. 6. This template has various fields which require a response from the employee. The fields include a title for the idea. In another field requiring employee input, the employee is queried whether this is a group idea. If it is a group idea, the names of the other participants in the group are added.

After this information is sent to the processor, the processor can then send a message to each of the indicated members of the group that an idea log has been established and that each member of the group may add to the idea independently, wherein all information entered by members of the group are stored in a single idea log entry including any change of status to the by a group member. The template also provides a location for indicating whether the idea has an expected financial impact. Such queries may be achieved using a check box on a WebPage or some other "yes/no" indicator. By structuring the templates requiring information within a specified format for preset fields, the information can be integrated into a database for analysis purposes, allowing for system metrics to be monitored. Additionally, the structured nature of the templates simplifies the creation of an idea and provides a mechanism for determining efficient routing and tracking of the idea for decision and implementation purposes.

The idea fundamental template also inquires which department is affected by the idea. The employee may then select one of the departments from a list. In larger organizations there may be sub-categories such as groups within a department or the first inquiry may be for the division that will be affected.

Figure 7:
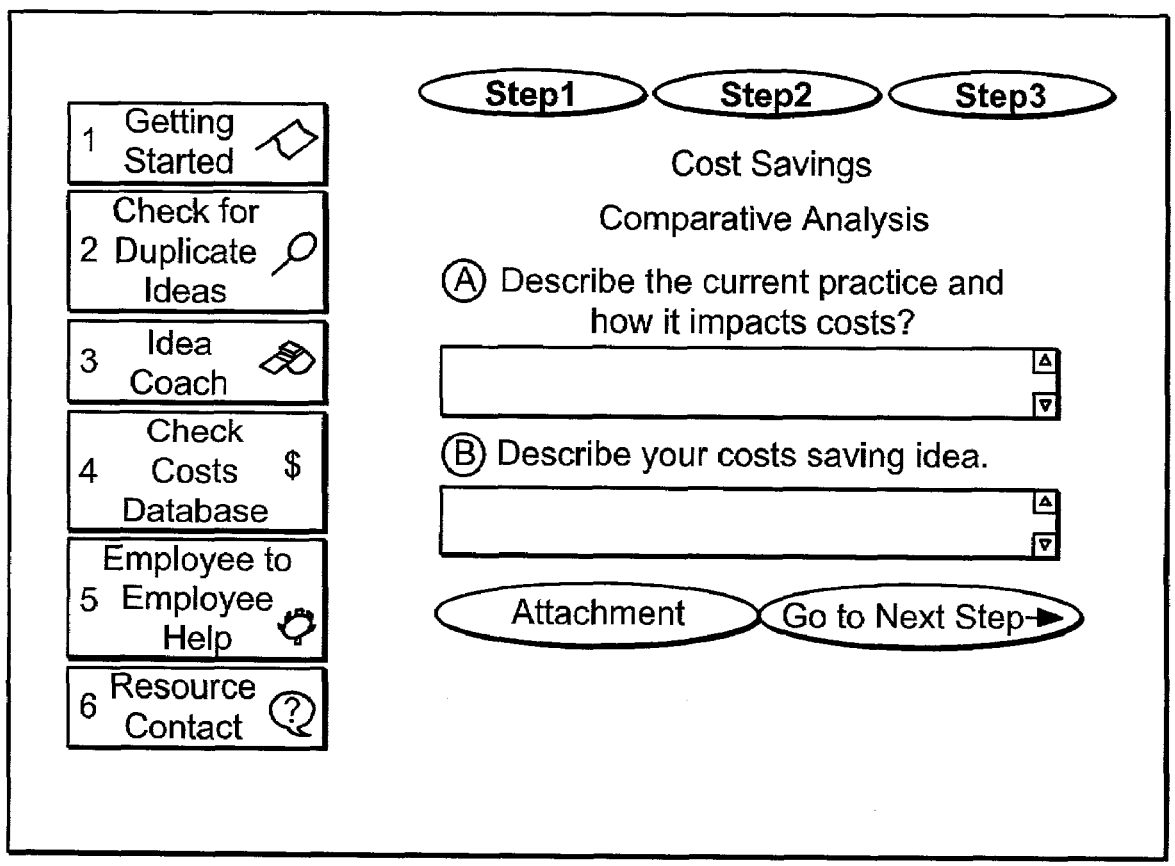
FIG. 7 is a representation of the comparative analysis template that allows an employee to make a comparative analysis between the new idea and the old method.

In certain embodiments a second template will be provided which allows for comparative analysis. An example of the comparative analysis template is shown in FIG. 7. This allows the employee to define the idea. The employee is requested to submit in prose what the idea is. Further, the comparative analysis page queries about the currently implemented method and how the new method will improve the currently implemented method including any benefits to the business. Based upon the type of idea that is selected, additional custom questions may be asked. The responses that are provided are associated with indicia which may be indicia of fields of a database stored at the server/processor. An example of a custom question for an idea which is categorized as the idea type "quality improvement" might be "How would you measure the potential quality improvement?". This question would be added in addition to the standard questions "Describe the current practice." and "Describe your improvement idea." This template again is customized by creating a custom HTML page or may be selected from one a group of pages based upon the initial responses by the employee to the idea fundamentals template.

The second step of the three part process is the financial information template as shown in FIG. 8. This template queries the employee to enter information regarding financial costs and benefits. The employee is queried to enter information into a table which has five sections. The first section asks the employee to enter financial information about the costs of the currently implemented method. Similarly the employee is asked to provide the new costs of the method, the new revenues of the method, costs associated with implementation of the method and capital required for the idea. By entering this information into discrete locations wherein each location is associated with a separate identifier, the system can calculate the overall financial benefit of the idea. This may be determined locally by running a program such as a JAVA application that is associated with the template or the information may be sent in a data stream to the processor which calculates the financial impact and then sends a template back to the employee which contains the overall financial impact. The employee has access to the cost database during entry of the financial information. The final financial impact cost/benefit assists the employee in determining if the idea is actually beneficial to the business and whether the employee should proceed with submission of the idea for implementation.

Figure 10:
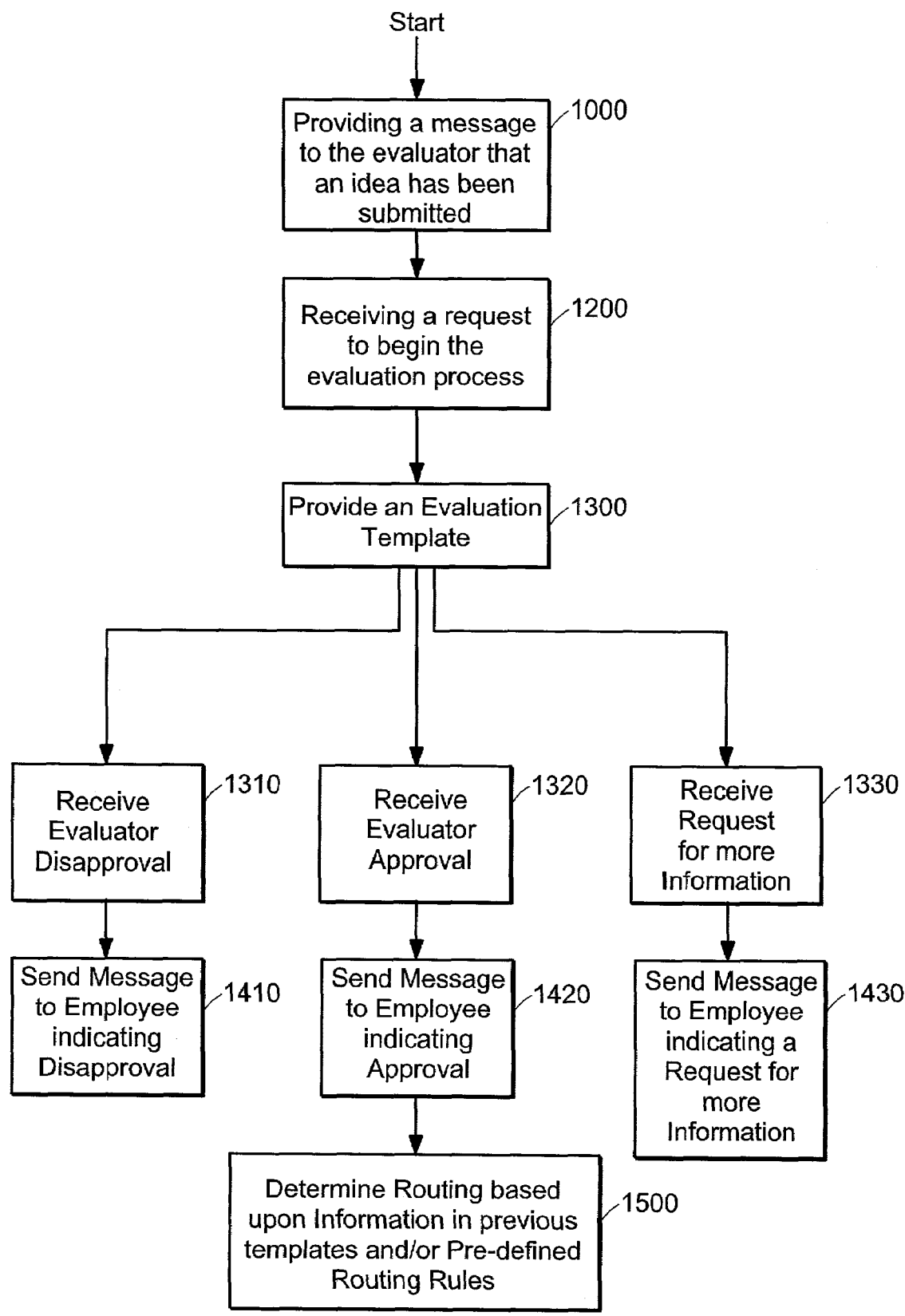
FIG. 10 is a flow chart that shows the evaluation process in one embodiment of the present invention.

The third template that is provided is the implementation detail template as shown in FIG. 9. The implementation details template queries the recommended steps for implementing the idea. It further asks such questions as what are the non-financial costs of implementation and other benefits of the idea. The employee is also requested to enter the names of potential implementers and additional information for contacting the implementers. The template also includes a location for entry of the estimated time for implementing the idea. Once this template is completed the idea can be sent from the processor/server to the evaluators or it may be saved as a work in progress. The evaluation process operates in the following manner in accordance with the flow chart of FIG. 10. The processor provides a message to the evaluator that an idea has been submitted (Step 1000) and sends a message to the employee that an evaluator has been selected. The message to the evaluator includes a time period for evaluation of the idea. The time period may be determined by any number of sources, including system policy, the employee formulating the idea, or a system administrator. It should be understood that at any time the idea is routed to another individual a separate time period may be initiated.

The system can then provide a key or password to the evaluator for accessing the idea log which is stored on the server. In another embodiment, the server forwards the idea log for the idea to the evaluator. This forwarding may occur in the form of a template, electronic mail or a series of templates. The evaluator can then request to begin the evaluation process, by sending the request which is received by the server (Step 1200). The server responds by providing a template a sample of which is shown in FIG. 10A (Step 1300). The evaluator can then enter a decision regarding the idea. The template allows the evaluator to approve the idea (Step 1310), disapprove the idea (Step 1320) or request more information (Step 1330). The evaluator may also evaluate the financial impact of the idea. Upon completion of the template, the information contained therein is sent to the server and the server parses the data stream. The decision of the evaluator is transmitted to the employee. The employee will receive a communication from the server which indicates that the idea was accepted 1400, was denied 1410 or that more information is required 1420. If the evaluator indicates that the idea is approved, the server begins the pre-implementation process and determines the routing of the idea to appropriate evaluators (1500). If more information is required, the server will provide a template to the employee for entering the additional information that was requested by the evaluator. It should be understood by one of ordinary skill in the art that this template may be automatically transmitted to the employee or that the system may be configured to send a message to the employee informing the employee to log into the server and view the idea log which would indicate that additional information is required. The server would be configured to provide a mechanism such that the employee could select to receive the template for adding the additional information. One example, of such a mechanism would be an automatic e-mail response mechanism, in which the employee would reply to the e-mail indicating that more information is required and the server would provide the template to the employee in response to receiving the reply e-mail.

In certain embodiment the evaluator is required to approve all aspects of the idea. The evaluator may be required to approve or adjust the selection of the one or more implementers as well as all of the cost estimates that were provided by the employee.

Upon expiration of the timers without receipt by the server of a decision from an evaluator, pre-implementer or decision maker, the server will send a reminder message indicating that a decision is required. In certain embodiments timers are automatically set such that any reviewer of the idea must respond within a fixed period of time. Further, the reminder message may also be sent to the reviewer's supervisor and the reminder may also be sent by the server to the employee creating the idea. Routing is determined by the server for the implementers by any of the above described routing criteria. Further, the implementer may be determined based solely upon the implementers selected by the employee submitting the idea, or the implementer may be determined based upon a look-up table for the given idea type. In either case, evaluators may be eliminated based upon workload. For example, workload may be based upon the overall number of hours being worked by an implementer, the availability of the implementer to actually implement the idea during a specified time period, or a combination thereof. It should be understood by one of ordinary skill in the art that the overall workload and the availability of the implementer may be weighted with different weights when determining an implementer. Workload as a routing criteria may be used at any point during the method for idea management including determining the evaluator(s), implementer(s) or decision maker(s).

Once the implementer is selected the implementer is presented with a template which is similar to the template of the evaluator as shown in FIG. 11. The template of the implementer is different in emphasis, as the implementer judges whether the implementation process suggested by the employee and reinforced by the evaluator is indeed feasible and whether the financial analysis of the employee is accurate for the implementation. The implementer may augment the implementation costs and recalculate the financial benefit to the business thereby updating the idea log which can then be reviewed by the employee. In other embodiments, the implementer is required to agree with all aspects of the idea before approving the idea. The implementer must also be willing to commit to execution of the idea by a given date.

After approval by the implementer, the server in some embodiments may make a routing decision and contact one or more final decision makers. Again, the routing decision that is made by the server can be based upon entries that are provided by either the employee, any of the previous evaluators of the idea or by a pre-configured default. For example, the server may be so configured as to use the names of additional suggested implementers which are entered by an implementer for determining the final decision maker(s). The server might make a routing decision and contact each of the superiors of the suggested implementers as the final decision makers. It should be understood by one of ordinary skill in the art that the methodology for routing can vary between different businesses without straying from the overall inventive concept. Further, it can be imagined that the routing criteria can be varied in a number of ways to best suit a particular business. For example, in smaller businesses, routing may be directed initially to the employee's supervisor and then to the company president for a final decision. In such an embodiment the evaluator at the pre-implementation phase may be the superior or the implementer may be the employee himself.

Once a decision maker is determined and the server identifies a destination address associated with the one or more decision makers through a look-up process, the decision makers are provided with a template. An example of such a template is shown in FIG. 12. The template allows the decision maker to approve the entire idea, disapprove the idea or approve the idea with modifications. These modifications may be modifications of the decision maker or modifications that were proposed by the first evaluator, or the implementer (s) during the pre-implementation phase. In other embodiments the decision maker may request additional information from any party having participated in the idea formulation process.

It should be understood, that there may be one or more person evaluating the idea at any step in the decision process. When there are more than one decision maker, the server coordinates all of the responses from the decision makers. In one embodiment the server waits for all of the decision makers to provide their decision before proceeding to determine routing. In such an embodiment, the idea needs approval from all of the decision makers. In other embodiments the decision may be made by a consensus of the decision makers and report a majority approval the server will begin to determine routing.

At the time of implementation of the idea, the implementer maintains a log which is stored within the idea log which contains the date of completion of the implementation and the actual costs accrued during the implementation. This information can then be compared to the predicted costs and the estimated time for completion of the idea's implementation and system metrics may be developed. As such, better estimates may be developed for future ideas and the cost database may be updated with the actual numbers. During the post-implementation, the implementer can maintain a log which the server uses in conjunction with the idea log to evaluate the actual value to the company.

It should be understood by one of ordinary skill in the art that there may be more than one employee submitting an idea. The first template queries the initial employee submitting the idea if the idea is a group idea. If it is a group idea the employee enters the names of the other participants. The server then parses the names of the other team members and sends each a message indicating that an idea has been created. If the idea is not a public idea each team member may be provided with a password to view the idea or the system may automatically recognize the team member based upon the log-in process to the server.

The system as presented may also include a workflow interface. This interface which is sent provided by the server to a processing device of an employee or a part of the business management allows for establishing the workflow criteria that will be used for making routing decisions. The manager may identify individuals to be designated as reviewers for each of the various idea types and for each of the departments or groups of the business. The division of labor may further be based upon location, and time zone. Order of the evaluation process may be changed in the workflow interface. Each business has its own workflow such that the pre-implementation process could be made to occur before the evaluation process simply by changing the workflow definition. Additionally, process steps could be included or left out. For example a business may require only a two step evaluation process where there is no final decision maker and only an initial evaluator and an implementer. After the work flow is configured and stored in associated memory the system may be created. For example, for each process step there can be either a pre-compiled module or an interpreted module which could then be combined in a deployment step which incorporates the stored workflow information.

Figure 13:
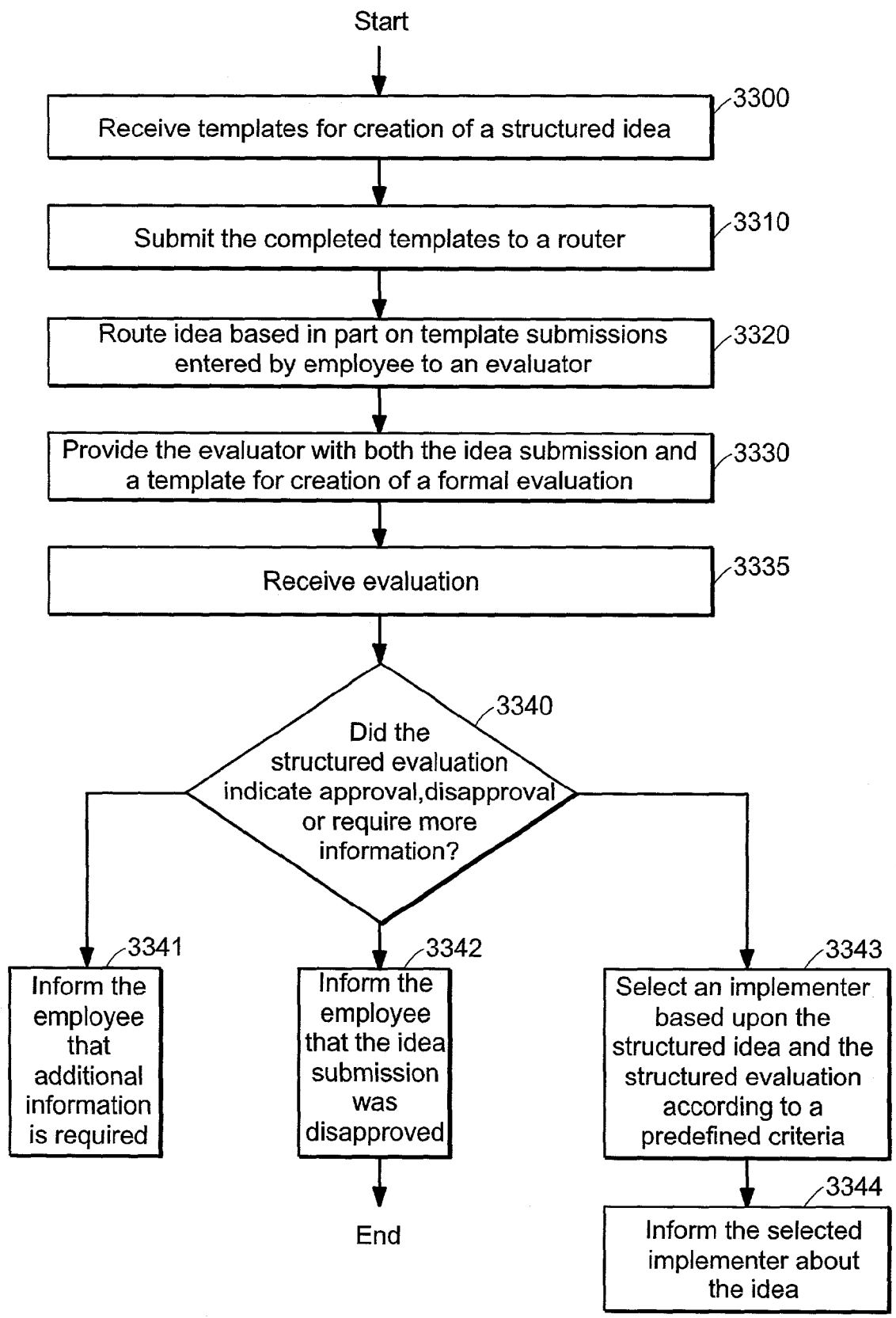
FIG. 13 is a flow chart that shows the steps for idea submission in which the process is performed manually.

FIG. 13 is a flow chart which shows the method as implemented in a manual environment. One of ordinary skill in the art should appreciate that the above described method of idea submission and development of an idea may take place without the use of a computer network. For example, a set of templates may be submitted to an employee for creation of a structured idea (Step 3300). The employee may fill out the templates. Based upon responses in the templates the employee is either presented with a new template or selects the next template to complete based upon the answers provided on a previous template. Once the employee has completed the three step process of filing out an idea fundamental template, a financial template and an implementation template, the templates are presented to a router (Step 3310). The router may be a person who reviews the responses in the templates and then can manually review lists of potential evaluators. The router then selects an appropriate evaluator (Step 3320). The evaluator may be selected based upon, for example, the department effected by the idea, workload of the evaluator, idea type, pre-defined business criteria. The evaluator is then provided a template by the router along with a copy of the templates of the employee which define the structured idea (Step 3330). The evaluator then makes a determination about the idea and fills in the template and he may indicate approval, disapproval or request additional information from the employee about the idea and sends the structured evaluation to the router (step 3335) The router who evaluates to whom the idea should be routed (Step 3340). If the evaluator has disapproved the idea, the router delivers a message to the employee indicating that the idea has been disapproved (Step 3342). If the template indicates that more information is required for an evaluation, the router sends a new template to the employee requesting additional information (Step 3341). If the evaluator approves the idea, the router then determines, based in part upon the structured idea and the structured evaluation who the idea should be routed to for implementation purposes (Step 3343). The router then forwards the structured idea and the structured evaluation to the selected implementer for further evaluation (Step 3344). As with the embodiment in which the system and method operated in a computer networked environment, there may be one or more evaluators in the process. If there is only one evaluator, the evaluator may perform the preliminary evaluation, the pre-implementation evaluation and make a final decision about the structured idea. If multiple parties are involved in the idea evaluation process, there may be one or more initial evaluators, one or more pre-implementation implementers and one or more final decision makers.

Preferred embodiments of the invention may be implemented as a computer program product for use with a computer system. Such implementation may include a series of computer instructions fixed either on a tangible medium, such as a computer readable media (e.g., a diskette, CD-ROM, ROM, or fixed disk) or transmittable to a computer system, via a modem or other interface device, such as a communications adapter connected to a network over a medium. Medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web or ASP).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A computer implemented method for providing through a computer network to business management a plan for implementing a user's suggestion for business improvement, the method comprising:

in a first computer process, causing presentation to a user seeking to submit a suggestion for business improvement, a series of two or more templates for entering a structured response on a terminal device, wherein one of the templates presented to the user allows the user to characterize the type of suggestion as falling into at least one of a plurality of categories selected from a group of cost saving, revenue generation, quality improvement, safety improvement, customer service improvement, development of a new product, policy change and advertising or corporate slogan;

receiving over a computer network the structured response, entered into the two or more templates from the user, wherein the structured response includes a characterization of the type of suggestion entered into one or more templates by the user and a server logically selects at least one of the templates presented to the user according to the type of suggestion characterized by the user; and in a second computer process, determining the network routing of data from the structured response to business management based upon entries of the response in one or more templates.

2. The method according to claim 1, wherein the server logically selects a plurality of templates subsequent to a first template based upon data entered by the user in one or more templates.

3. The method according to claim 1, wherein at least one template provides for entry of cost savings information.

4. The method according to claim 1, wherein at least one template provides for access to a database containing cost information.

5. The method according to claim 1 wherein a template is provided based upon a selected department of the business.

6. The method according to claim 1 wherein a financial template is provided based upon the type of suggestion characterized.

7. The method according to claim 6, further comprising calculating a financial benefit based upon submissions in the financial template.

8. The method according to claim 7 further comprising obtaining financial data requested from the network.

9. The method according to claim 8 wherein access to financial data is controlled through a user's log-in for the computer network.

10. The method according to claim 8 wherein if no financial data is available in a database associated with the network and the user enters financial data in a template the method further comprises:
adding the financial data to the database for a subsequent user suggestion.

11. The method according to claim 1, wherein determining the network routing is dependent in part on a business group that is selected on a template by the user.

12. The method according to claim 1, wherein determining the network routing is dependent in part on a user's response to whether the suggestion has a financial benefit.

13. The method according to claim 1 wherein determining the network routing is dependent in part on a selected department affected by the user suggestion.

14. The method according to claim 1 wherein determining the network routing is dependent in part on whether the user indicates that the suggestion is a team suggestion.

15. The method according to claim 1, wherein determining the network routing is dependent in part on the suggestion characterized by the user.

16. The method according to claim 1, wherein a template provides a user with selectable items having associated financial information.

17. The method according to claim 16, wherein a processor determines the net financial impact based upon the one or more selectable items selected.

18. The method according to claim 17, wherein the processor obtains financial information from a business database based upon the selected selectable items.

19. The method according to claim 16 wherein an employee may add one or more financial impact items and request financial information from the business database about the financial impact items.

20. The method according to claim 1, further comprising receiving information from a template at a processor wherein the information contains financial data about a financial impact item and adding the financial data about the financial impact item to a business database.

21. The method according to claim 1, wherein a template is provided which allows a user to enter one or more potential implementers of the employee suggestion.

22. The method according to claim 21, wherein determining the network routing is dependent in part upon the one or more potential implementers selected.

23. The method according to claim 1, wherein determining the network routing is dependent in part upon a deadline selected by the user.

24. The method according to claim 1 wherein determining the network routing is dependent in part upon information about the user submitting the suggestion.

25. The method according to claim 24, wherein the user is an employee and such information may include the department of the business that the employee works in.

26. The method according to claim 1, further comprising:
receiving over a network a structured reply to the structured response from one or more members of business management.

27. The method according to claim 26, wherein the structured reply is based upon response by business management to one or more templates.

28. The method according to claim 26, wherein business management is sent cost information from a cost database associated with a processor.

29. The method according to claim 26, wherein receipt of the structured reply causes a processor to contact the user submitting the structured suggestion.

30. The method according to claim 29, wherein the processor contacts the user via e-mail.

31. The method according to claim 26, wherein the processor routes a new template to the user requesting more information about the employee suggestion in response to the structured reply.

32. The method according to claim 1, further comprising:
maintaining a user suggestion log in memory associated with the processor.

33. The method according to claim 32, wherein the user suggestion log contains information entered by the user on a series of templates, information regarding routing of the user suggestion and status of the user suggestion.

34. The method according to claim 32, upon request by the employee submitting the employee suggestion, providing a displayable version of the user suggestion log via the computer network to a computer associated with the user submitting the suggestion.

35. The method according to claim 1, wherein a template is provided to the user for entering information regarding implementation of the user suggestion.

36. The method according to claim 35, wherein the information regarding implementation includes identification of possible implementers.

37. The method according to claim 36, further comprising:
after receiving information from business management indicating acceptance of the user suggestion, sending via the computer network information about the user suggestion to the possible implementers.

38. The method according to claim 1, if a deadline for response to the user suggestion expires, sending a reminder via the computer network to the business management that received the user suggestion.

39. The method according to claim 1, wherein determining network routing is based in part on workload of the business management.

40. A computer program product comprising a computer readable storage medium having computer readable code thereon for providing to business management a plan for implementing a user's suggestion, the computer readable code comprising:
computer code for presenting to a user seeking to submit a suggestion for business improvement, a series of two or more templates for entering a structured response, wherein at least one of the templates contains a field for selecting the type of suggestion from the group of cost saving, revenue generation, quality improvement, safety improvement, customer service improvement, development of a new product, policy change and advertising or corporate slogan;
computer code for obtaining over a computer network the structured response, entered into the two or more templates, from the user, wherein the structured response includes a characterization of the type of suggestion entered into one or more templates by the user and at least one of the templates presented to the user is selected according to the type of suggestion characterized by the user;
computer code for determining network routing of data from the structured response to business management based upon entries of the response in one or more templates.

41. The computer program product according to claim 40, further comprising:
computer code for selecting additional templates to develop the structured response wherein, a plurality of templates is selected based upon information entered by the user within at least one prior template.

42. The computer program product according to claim 40, wherein at least one template provides for entry of cost savings information.

43. The computer program product according to claim 40, wherein at least one of the templates provides for access to a database containing cost information.

44. The computer program product according to claim 40, wherein a template is chosen based upon a selected department of the business.

45. The computer program product according to claim 40, wherein a financial template is provided based upon the type of suggestion characterized.

46. The computer program product according to claim 45, further comprising computer code for calculating a financial benefit based upon one or more transmitted submissions from the financial template.

47. The computer program product according to claim 40 further comprising: computer code for obtaining financial data requested from the network.

48. The computer program product according to claim 47 wherein access to financial data is controlled through an employee's log-in for the computer network.

49. The computer program product according to claim 48 wherein if no financial data is available in a database associated with the network and the user enters financial data in a template the computer program product further comprises: computer code for adding the financial data to the database for a subsequent user suggestion.

50. The computer program product according to claim 40, wherein in the computer code for determining the network routing, the network routing is determined in part on a business group that is selected on a template by the user.

51. The computer program product according to claim 40, wherein in the computer code for determining the network routing, the network routing is dependent in part on a user's response to whether the suggestion has a financial benefit.

52. The computer program product according to claim 40, wherein in the computer code for determining the network routing, the network routing is dependent in part on a selected department affected by the user suggestion.

53. The computer program product according to claim 40, wherein in the computer code for determining the network routing, the network routing is dependent in part on whether the user indicates that the suggestion is a team suggestion.

54. The computer program product according to claim 40, wherein in the computer code for determining the network routing, the network routing is dependent in part on the suggestion characterized by the user.

55. The computer program product according to claim 40, wherein a template provides the user with selectable items having associated financial information.

56. The computer program product according to claim 55, having computer code for determining the net financial impact based upon the one or more selected selectable items having associated financial information.

57. The computer program product according to claim 56, further comprising computer code for obtaining financial information from a cost database based upon the selected selectable items.

58. The computer program product according to claim 57 further comprising computer code for sending a request for financial information about one or more financial impact items to one or more sources.

59. The computer program product according to claim 40, further comprising: computer code for receiving information from a template wherein the information contains financial data about a financial impact item; and computer code for adding the financial data about the financial impact item to a cost database.

60. The computer program product according to claim 40, wherein a template is provided which allows the user to enter one or more potential implementers of the employee suggestion.

61. The computer program product according to claim 60, wherein the computer code for determining the network routing is dependent in part upon the one or more potential implementers selected.

62. The computer program product according to claim 40, wherein the computer code for determining the network routing is dependent in part upon a deadline selected by the user.

63. The computer program product according to claim 40, wherein the user is an employee of the business and the computer code for determining the network routing is dependent in part upon information about the employee submitting the suggestion.

64. The computer program product according to claim 63, wherein such information may include the department of the business that the employee works in.

65. The computer program product according to claim 40, further comprising: computer code for receiving over a network a structured reply to the structured response from one or more members of business management.

66. The computer program product according to claim 65, wherein the structured reply is based upon response by business management to one or more templates.

67. The computer program product according to claim 65, further comprising computer code for sending business management cost information from a cost database.

68. The computer program product according to claim 67, further comprising code for sending the message via electronic mail.

69. The computer program product according to claim 65, further comprising computer code for sending a message to the user submitting the structured suggestion upon receipt of the structured reply.

70. The computer program product according to claim 65, further comprising computer code for routing a new template to the user requesting more information about the user suggestion in response to the structured reply.

71. The computer program product according to claim 40, further comprising:
maintaining a user suggestion log in memory.

72. The computer program product according to claim 71, wherein the employee suggestion log contains information entered by the user on a series of templates, information regarding routing of the user suggestion and status of the user suggestion.

73. The computer program product according to claim 71, further comprising:
computer code for providing a displayable version of the user suggestion log via the computer network, upon receipt of a request by the user submitting the employee suggestion.

74. The computer program product according to claim 40, further comprising computer code for providing a template to the user for entering information regarding implementation of the employee suggestion.

75. The computer program product according to claim 74, wherein the information regarding implementation includes identification of possible implementers.

76. The computer program product according to claim 75, further comprising: computer code for sending via the computer network information about the user suggestion to the possible implementers, after receiving information from business management indicating acceptance of the user suggestion.

77. The computer program product according to claim 40, further comprising:
   computer code for sending a reminder via the computer network to the business management that received the user suggestion if a deadline for response to the user suggestion expires.

78. The computer program product according to claim 40, wherein network routing is based in part on workload of the business management.

79. A method for directing a computerized idea submission in a business to appropriate business managers for improving the business, the method comprising:
   in a first computer process, causing presentation of a plurality of templates to a user, wherein the templates require one or more responses, wherein one of the templates presented to the user allows the user to characterize the type of idea as falling into at least one of a plurality of categories selected from a group of cost saving, revenue generation, quality improvement, safety improvement, customer service improvement, development of a new product, policy change and advertising or corporate slogan;
   in a second computer process, receiving a completed set of templates from the user creating a structured idea;
   in a third computer process, determining the routing of the structured idea to an appropriate business manager based at least in part upon the one or more responses;
   in a fourth computer process, providing an evaluation template to the appropriate business manager based upon the determined routing;
   in a fifth computer process, receiving a completed evaluation template from the appropriate business manager; and
   in a sixth computer process, routing the idea to an implementer if the idea is approved, wherein the routing is determined in part on the completed evaluation template.

* * * * *